United States Patent [19]

Morton

[11] Patent Number: 4,580,215
[45] Date of Patent: Apr. 1, 1986

[54] ASSOCIATIVE ARRAY WITH FIVE ARITHMETIC PATHS

[75] Inventor: Steven G. Morton, Oxford, Conn.

[73] Assignee: ITT Corporation, New York, N.Y.

[21] Appl. No.: 473,362

[22] Filed: Mar. 8, 1983

[51] Int. Cl.[4] .......................................... G06Z 13/00
[52] U.S. Cl. .................................. 364/200; 364/716
[58] Field of Search ... 364/200 MS File, 900 MS File, 364/736, 749, 716

[56] References Cited

U.S. PATENT DOCUMENTS

| | | | |
|---|---|---|---|
| 4,030,077 | 6/1977 | Florence et al. | 364/900 |
| 4,065,808 | 12/1977 | Schomberg et al. | 364/200 |
| 4,090,249 | 5/1978 | Chen et al. | 364/900 |
| 4,149,242 | 4/1979 | Pirz | 364/200 |
| 4,270,169 | 5/1981 | Hunt et al. | 364/200 |
| 4,270,170 | 5/1981 | Reddaway | 364/200 |
| 4,418,383 | 11/1983 | Doyle et al. | 364/200 |
| 4,438,491 | 3/1984 | Constant | 364/200 |
| 4,447,498 | 4/1984 | Rosen | 364/749 |
| 4,466,064 | 8/1984 | Martin | 364/200 |
| 4,468,727 | 8/1984 | Carrison et al. | 364/200 |
| 4,507,726 | 3/1985 | Grenberg et al. | 364/200 |
| 4,507,748 | 3/1985 | Cotton | 364/749 |
| 4,524,455 | 6/1985 | Holsztyski et al. | 364/200 |
| 4,533,993 | 8/1985 | McCanny et al. | 364/200 |

*Primary Examiner*—James D. Thomas
*Assistant Examiner*—Thomas Lee

[57] ABSTRACT

An associative processor array including M rows and N columns of identical processing cells with each cell connected horizontally to its left and right to a neighboring cell. Each cell includes a memory for storing control and data information with the output of the memory coupled to an arithmetic logic unit (ALU) and with the output of the ALU coupled to register means associated with each cell. The entire array formed by the individual cells is capable of performing arithmetic operations on digital words where each word consists of a plurality of bits and a given number of slices. Pursuant to this invention the cells are coupled together in a row via five data paths wherein a first path is operative to move a bit from left to right or from right to left and which first data path is coupled to the memory means in the cells. The second data path is coupled to the ALU's and operative to propagate the arithmetic carry from the ALU of any of the cells unidirectionally to another cell in the same row. A third data path is coupled to each of the cells in the row and operates to move a second bit from one cell to the next in a given selected direction. There are means associated with each cell responsive to the second bit to store the same. The fourth data path is coupled to each of the cells in the row and operative to move a third bit from the ALU of one cell to the next cell, and a fifth data path is operative to move a fourth bit bidirectionally and includes storage register means for storing said fourth bit to enable said cell to operate to perform said arithmetic function according to the bit as stored in the cell.

16 Claims, 26 Drawing Figures

ASSOCIATIVE ARRAY WITH FIVE ARITHMETIC PATHS

BACKGROUND OF THE INVENTION

1. Field of the Invention

The present invention relates generally to associative processing and more specifically to an associative processing array structure having a variable word length and an extensive instruction set. The instruction set includes a boolean multiple, divide, and all combinations of single or double precision, shift or rotate, left or right operations. The associative processing array of the present invention is particularly advantageously utilized in an LSI (large scale integrated circuit) or VLSI (very large scale integrated circuit) configuration, in that increased flexibility may be obtained without an increase in the amount of circuitry and pin connections.

Associative processors having the aforementioned variable word length and arithmatic and shift capability are useful not only in associative processing computers, but also are useful generally in systems requiring a fast and flexible computation capability. Such systems include, by way of example, engineering workstations, data base management systems, topological analysis, graphics display, speech recognition, image enhancement, radar applications such as phased arrays, synthetic apertures, echo and wake analysis and tracking, text management systems and telecommunications, including digital filtering applications.

2. Description of the Prior Art

Associative processors may be considered as arrays of single bit processors wherein each single cell only accesses its neighbor cells. Associative processors may be accessed by mutual parallel data streams, the memory thereof is addressable by content and the data structure is based on tags.

While a conventional processor operates on one data item at a time sequentially, an associative processor operates on many data objects simultaneously. For this to be useful, the data objects must be of the same type for any individual instruction so that it is meaningful to apply the same sequential instruction stream to operate simultaneously on these data objects. This class of processor is known as a Single Instruction Multiple Data processor (SIMD).

The associative processor may consist of a rectangular array of single bit computers implemented in LSI, each capable, for example, of having from 2K to 64K bits of memory. These cellular computers obey the same instruction simultaneously, each operating on its own data. The cells can communicate in all four directions with their neighbors and also with external data input and output registers.

The cells in a row of the associative processor array can be dynamically (from one instruction to the next) configured into an arbitrary number of fields of arbitrary defined length (within the constraints of the width of the array). Each field can then operate independently as if it were a separate computer of the given word length, able to perform arithmetic and logical operation. These fields can all obey the same instruction simultaneously, or they may be selectively disabled under program control.

The net effect is that of a set of computers of arbitrarily defined word length, which when they are enabled, obey the same arithmetic or logic operation simultaneously on different data items. This set of computers can be applied to problems requiring matrix arithmetic, algebra, vector calculations, image (pixal) processing, searching and pattern recognition problems, and speech recognition. They can perform both fixed point and floating point arithmetic to any required accuracy. The throughput of this set of processors is dependent on the size of the array, the length and number of fields and the proportion of the array which is enabled for a particular operation. For example, a $128 \times 128$ cell array operating on 2048 eight bit numbers simultaneously using a 10 MHz clock is estimated to achieve on the order of 4,000 million additions or logical operations per second and on the order of 1,000 million multiplications per second.

Associative memories, sometimes referred to as Content Addressable Memories, are well known generally, and are organized to function in an associative processor, wherein arithmetic operation may be performed on one or more digital words stored in the memory simultaneously. Such associative processors are described in U.S. Pat. No. 4,068,305. As illustrated by U.S. Pat. No. 4,296,475, such content-addressable memories are word-organized, and efforts have been made to reduce the number of connection pins required for employing the memory. Association between certain bits of an instruction word and previously assigned flags (from status flip-flops, for example) is known such that a data processor executes instructions conditionally by providing masking bits in the instruction word to override one or more association bits. The foregoing is described by U.S. Pat. No. 4,010,452. U.S. Pat. No. 4,044,338 describes an associative memory having separately associable zones. Selective coupling of circuit elements to a data bus wherein each circuit element has an associative address is described by U.S. Pat. No. 4,188,670. U.S. Pat. No. 4,159,538 is illustrative of an LSI associative memory wherein the number of pin connections is reduced by sharing certain package pins by input data, output data and mask information. A serially accessed associative memory is described by U.S. Pat. No. 4,153,943. An Associative Storage Apparatus for Comparing Between Specified Limits is described by U.S. Pat. No. 3,845,465. An Array Processor with processing elements arranged in a rectangular array is described by U.S. Pat. No. 3,979,728. U.S. Pat. No. 3,654,394, Field Effect Transistor Switch, Particularly for Multiplexing, described multiplexing analog signals. U.S. patent application No. 452,596 filed Dec. 23, 1982 by S. Morton, "Impendance Restoration for Fast Carry Propagation", describes a cellular, dynamically configurable adder.

SUMMARY OF THE INVENTION

An associative processor is described wherein an array of associative processing cells is intervened by five paths between adjacent horizontal cells.

It is an object of this invention to provide the minimum number of interconnections and thus the minimum number of pins and the minimum amount of hardware, that is necessary to accomplish multiple divide and double precision rotate left and rotate right operations. This provides increased flexibility in the use of an associative array in that word length can be arbitrarily extended, and desired functions may be arbitrarily performed within the array, such as for instance skip of disable functions.

It is an object of the present invention to:

(1) provide enhanced flexibility in the use of Associative processors.
(2) allow arbitrarily long word lengths without regard to the number or processing cells contained on a chip.
(3) minimize the number of interconnections between processor cells in an associative processor.

DETAILED DESCRIPTION OF THE INVENTION

1. Introduction

Figure 1:
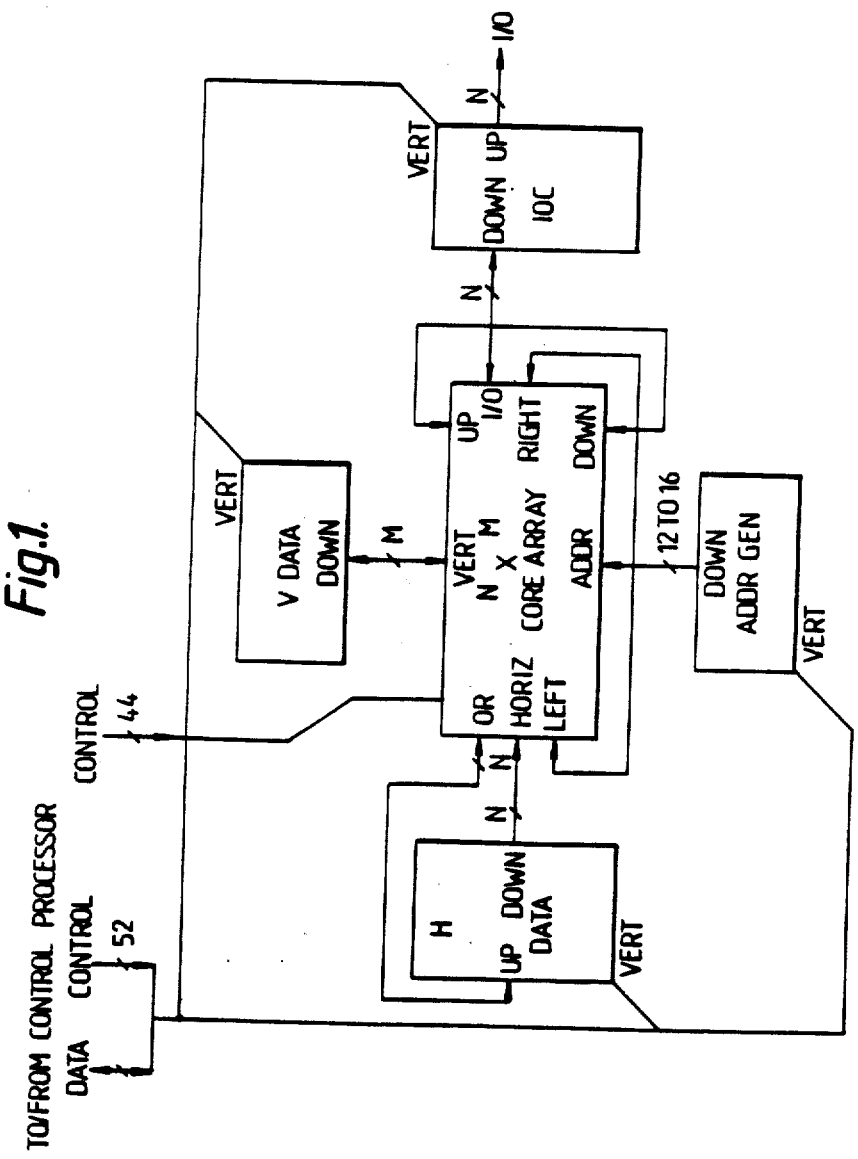
FIG. 1 is a Block Diagram of an associative processor.

Data processing on an associative processor as shown in FIG. 1 is performed on an N×M array. The size of the array is not important for purpose of the invention although larger arrays will provide higher throughputs. The N×M array, by nature of the dynamic repartionability of an associative processor can equally well operate on N M-bit numbers, 2N M/2-bit numbers, 4N M/4-bit numbers, or other combination having the same number of total bits. Additionally, the array may operate with a lesser number of total bit requirements although less than all cells in the array will be utilized during such an portion.

Figure 2:
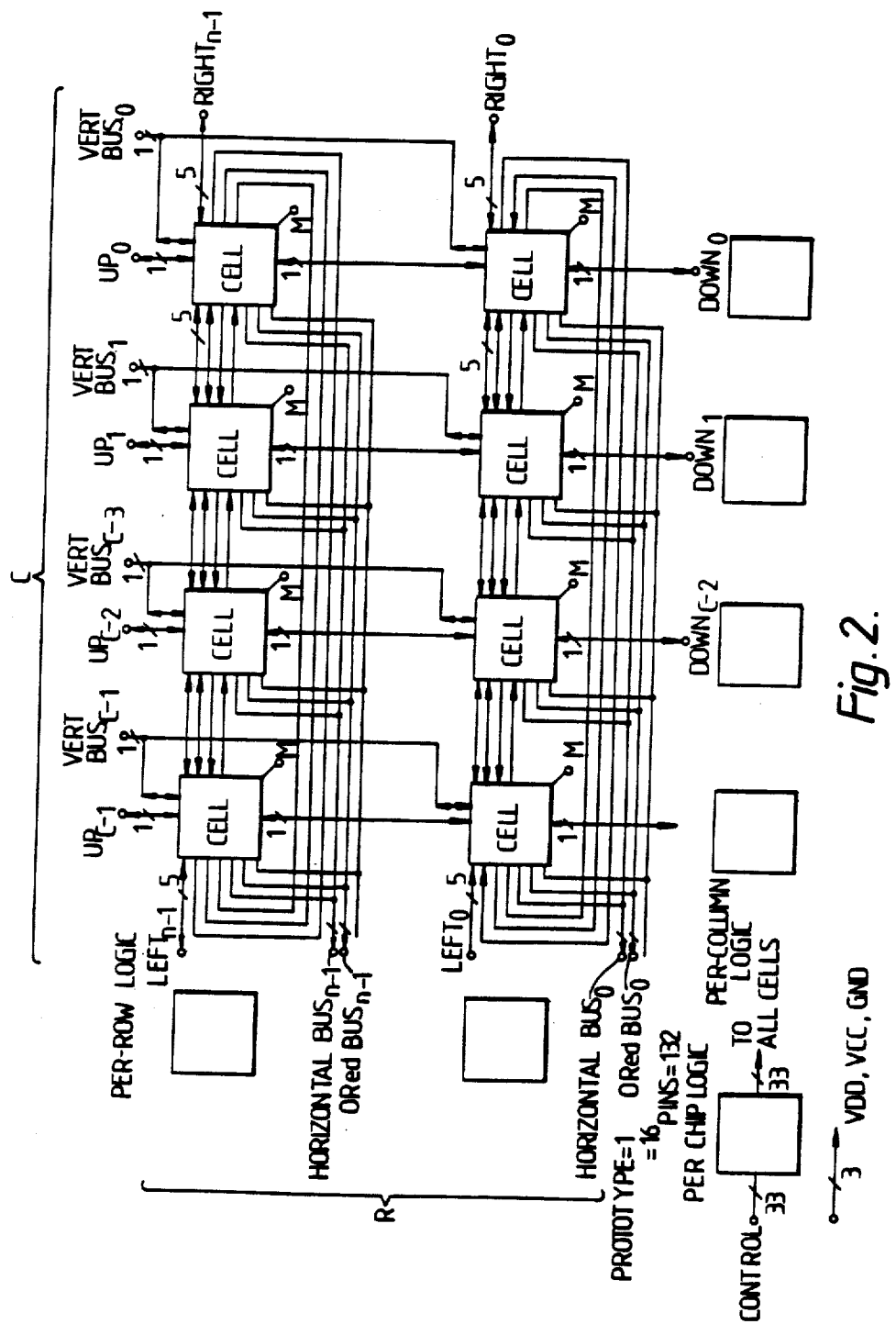
FIG. 2 is an illustration of an associative processor chip showing the interconnection of processing cells.

The associative processor array described herein is implemented as M rows by N columns of identical cells. Each cell is a single-bit processor and is connected horizontally to its left and right, and vertically to its up and down, neighbors, and at right angles to this plane of cells, to bulk off-chip memory. In addition, there is a Vertical Bus connecting all cells in a column, and a Horizontal Bus connecting all cells in a row. A multiplicity of cells are preferably implemented on a single integrated circuit. A portion of this associative processor is shown in FIG. 2.

In order to process information in an associative processor, it is necessary to define the number of bits which comprise one number.

This is referred to as the word size. Within the associative processor words are formed from groups of one-bit cells working together. Any cell within the associative processor can have any bit position in a word, although the bit-significance of the cells in a word must be unchanged or increase monotonically across a row. Also, carry in an arithmetic operation must flow from right to left, i.e., from a lesser numbered column to a greater numbered column. Minimum word sizes are 1 bit for logical operations and 2 bits for fixed point arithmetic operations.

Figure 3:
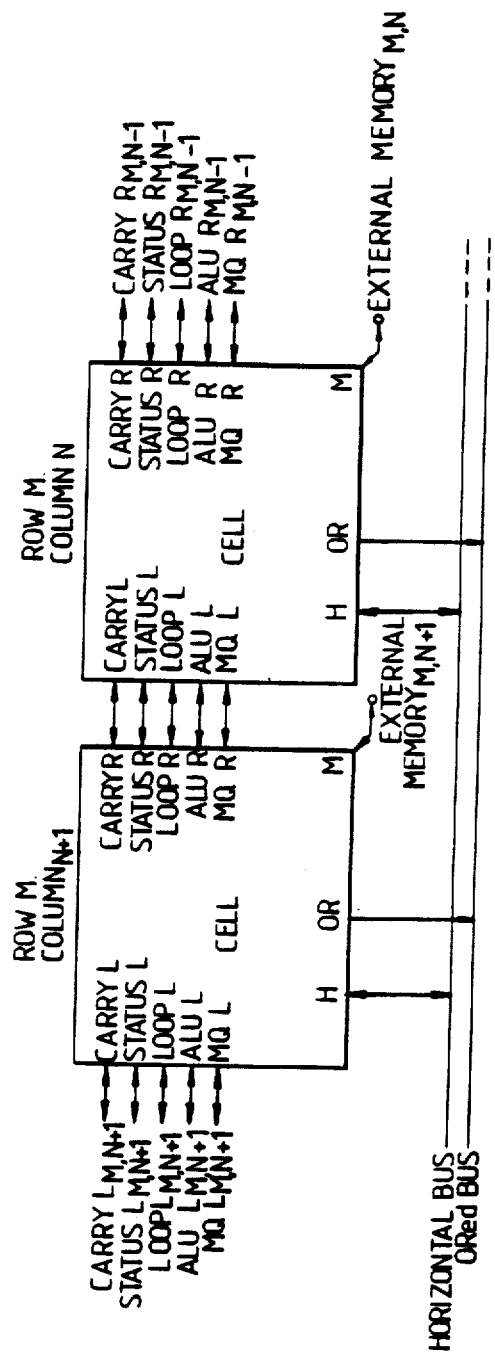
FIG. 3 is an illustration showing the primary horizontal interconnections between adjacent processing cells.

Words may be formed from cells that are in multiple chips, and there is no fundamental upper limit on word size. A cell operates in a given manner regardless of whether it is on a chip boundary, hence a given cell works in exactly the same way regardless of whether its neighboring cell is in the same or a different chip. It is furthermore irrelevant whether that other chip is in the same or a different row. The interconnection between adjacent cells along the horizontal rows in the processor is shown in FIG. 3 and includes five arithmetic connections, the carry path, the ALU path, the MQ path, the loop path and the status path.

An array of chips may be configured in two ways; either by placing chips side by side, to increase the width of the array, or one above another, to increase the height of the array. In either case the down signals for the bottom-most row are typically connected to the Up signals from the top-most row. The connections of the five arithmetic processor signals will be described later. For ease of explanation, reference will be made to the arrangement wherein the array has 16 rows and 16 columns.

The operation of each cell in this array is determined by two things. (1) There are control bits that are sent to all cells and it will be assumed that there are 32 control bits. These bits are supplied from outside the chip and are partitioned into 24 data path control, 5 status control, 2 memory data register control, and 1 enable bit. The data path control bits include 6 instruction bits that choose the arithmetic, logical, shift, or configuration operation that is to be performed on a word. (2) There are configuration bits that are stored in a multiport RAM in each cell, and 3 of these bits are decoded to identify, among other things, the LSS, ISS's, and MSS in a word. In all there are 7 configuration bits contained in each cell, 3 ALUP (Arithmetic Logic Unit Processor) Horizontal Masks, 3 ALUP Vertical Masks, and an Impedance Restoration Mask.

Figure 11:
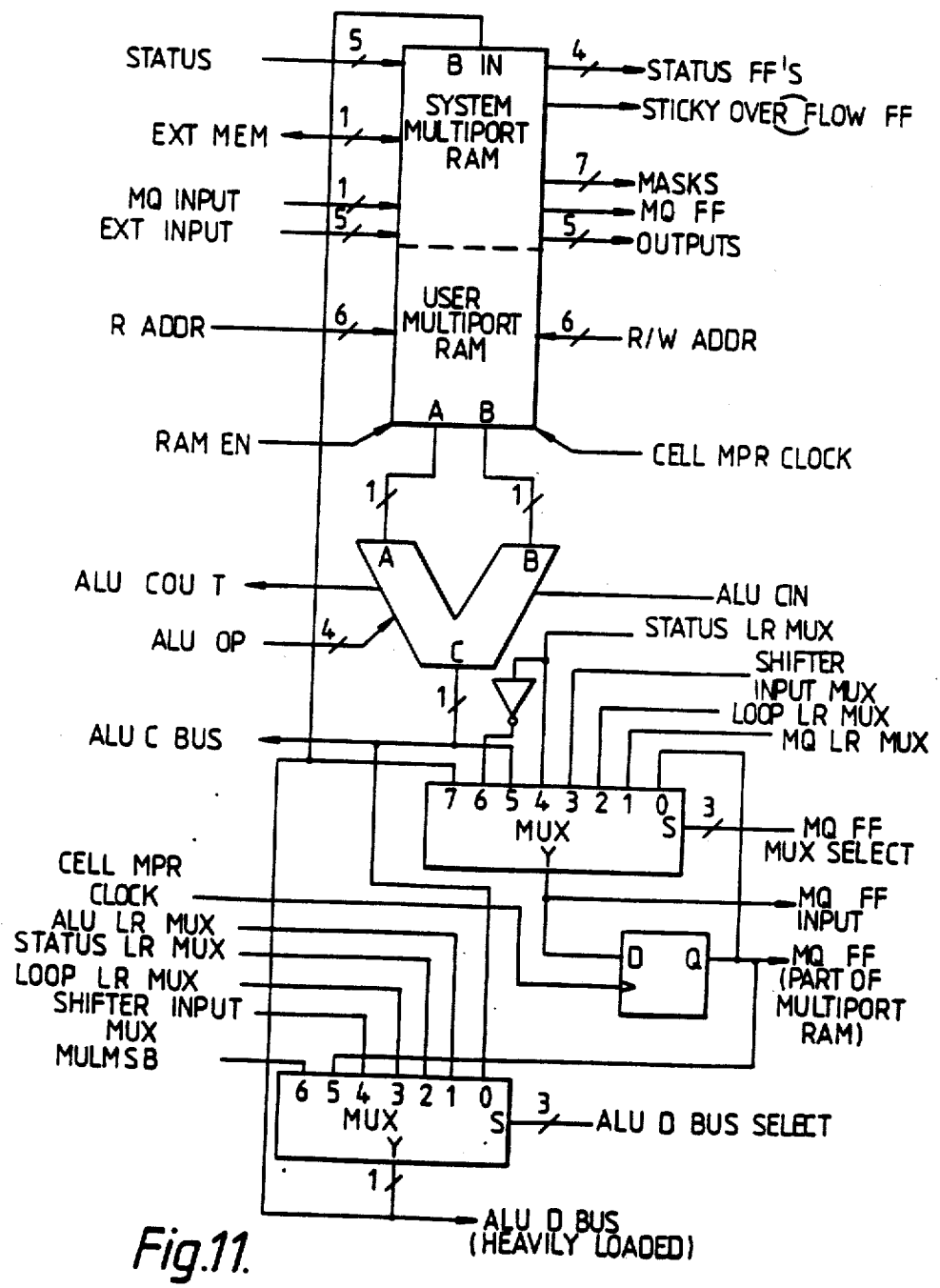
FIG. 11 is a diagram of the arithmetic core in a processing cell.

As shown in FIG. 11, each cell has 64 bits of random access storage. This storage is a multiport RAM, which, in the view of the arithmetic and logic unit, has two outputs, A and B. The 6-bit Read Address (R ADDR) selects one location, while the 6-bit Read/Write Address (R/W ADDR) selects another location. If a result is written to memory, the Read/Write Address specifies both one of the sources and also the destination of the data.

The multiport Ram is conceptually divided into upper and lower halves. The lower 32 locations are considered user memory and have no special properties. The upper 32 locations are considered system memory and have many special properties.

There are numerous direct inputs to, and direct outputs from, the system memory to provide control and data paths that operate in parallel with the arithmetic and logic unit. Access to off chip memory, the Up and Down Paths, and the Vertical and Horizontal busses is all provided through the system memory. The configuration bits, the multiplier/quotient register, and the status bits are also in upper memory.

Figure 4:
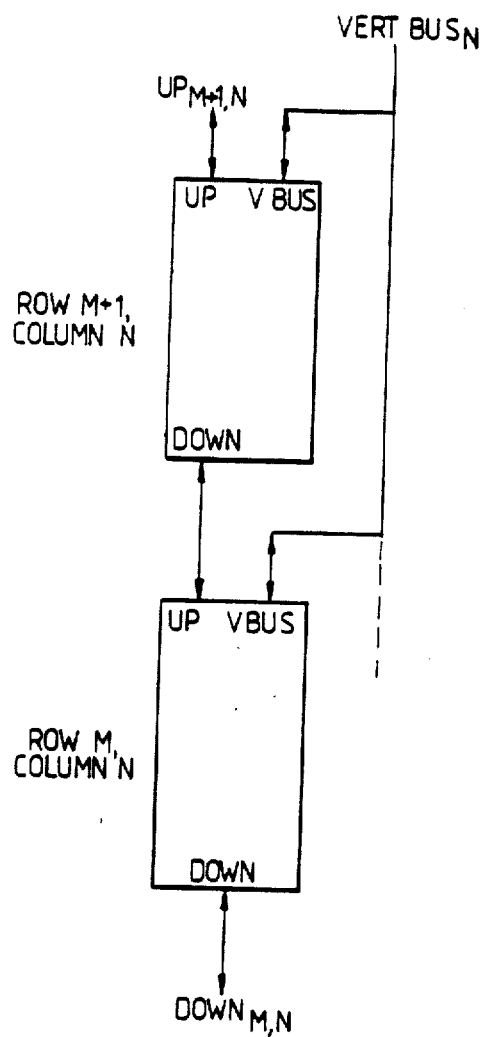
FIG. 4 is an illustration showing the vertical interconnections between adjacent processing cells.
Figure 5:
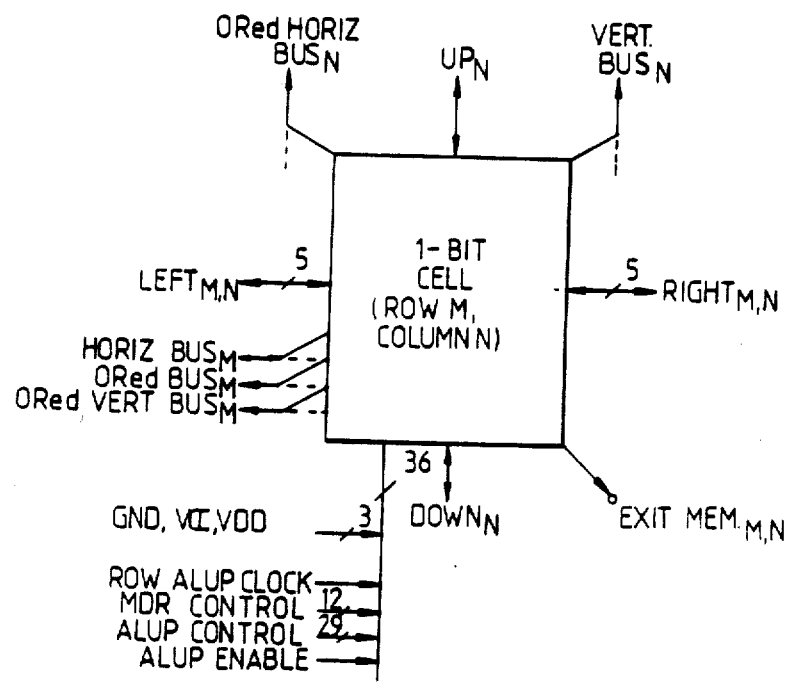
FIG. 5 is an illustration showing the overall interconnections of a processing cell.

The global view of connections to the chip and between cells is shown in FIG. 2. The details of horizontal connections between two cells are shown in FIG. 3, and of vertical connections between two cells in FIG. 4. These connections apply regardless of whether or not the cells are in the same or different chips. All connections to a single cell are shown in FIG. 5.

The five arithmetic path signals are connected between chips to enable words to span multiple chips. The ALU Left, Carry Left, MQ Left, Loop Left, and Status Left signals from the left-most column of a chip are typically connected to the right of the right-most column of a chip that is to the left in the same row, or, if the chip is in the left-most column of the array, to the right of the right-most chip in the array in the row above. The ALU Left, Carry Left, MQ left, Loop Left, and Status Left signals of the top row, left-most chip in the array, are typically connected to the right of the right-most chip in the array in the bottom row.

2. Slice Types

Cells are organized into words by the 3 ALUP Horizontal Masks. The Configure instruction is intended to facilitate the loading of these masks independent of their state. These masks must be loaded before the instruction set, other than the Configure instructions, is executed.

Figure 8:
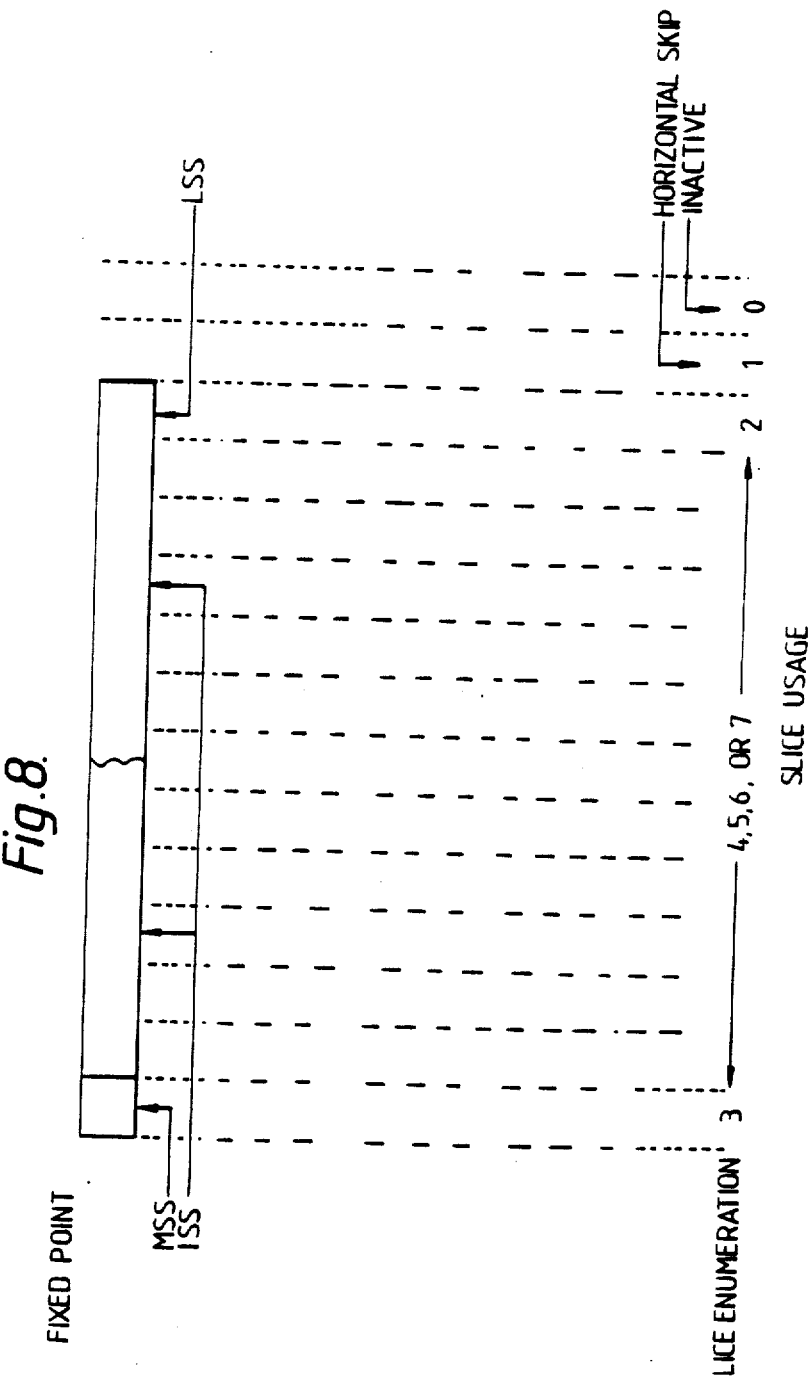
FIG. 8 shows slice usage.

The way a particular cell performs an instruction is dependent on the type of slice to which it has been set. The partitioning of a word into slices is shown in FIG. 8, and the use of the five implemented slices, as chosed by the 3 ALUP Horizontal Mask bits, is:

Cells are organized into words by the 3 ALUP Horizontal Masks. The Configure instruction is intended to facilitate the loading of these masks independent of their state. These masks must be loaded before the instruction set, other than the Configure instructions, is executed.

The way a particular cell performs an instruction is dependent on the type of slice to which it has been set. The partitioning of a word into slices is shown in FIG. 8, and the use of the five implemented slices, as chosen by the 3 ALUP Horizontal Mask bits, is:

Inactive—causes a cell to have its storage is frozen and to be horizontally invisible.

Horizontal Skip—causes a cell to be horizontally invisible, but allows its storage to be updated. The Horizontal Skip slice is useful when one wants to replicate a bit in a number of slices, such as for sign extension.

Fixed point arithmetic, which may also include characters, has three logical types of processor slices.

LSS: least significant slice. End-of-word condition may be specified: Carry in, for an arithmetic instruction, or the serial input, for a shift left, is selected by Serial input select.

MSS: most significant slice End-of-word conditions may be specified: The serial input, for a shift right, is selected by Serial Input Select.

ISS: intermediate significance slice. All connections are specified by the instruction e.g., carry In comes from the slice to the right, and carry out goes to the slice on the left.

Single-bit, logical values, may be slice type LSS. Arithmetic and rotation instructions require words with at least 2 bits, an LSS and an MSS, and may have any number of ISS's.

3. Major Hardware Blocks

3.1 Instruction Pipeline

Figure 9:
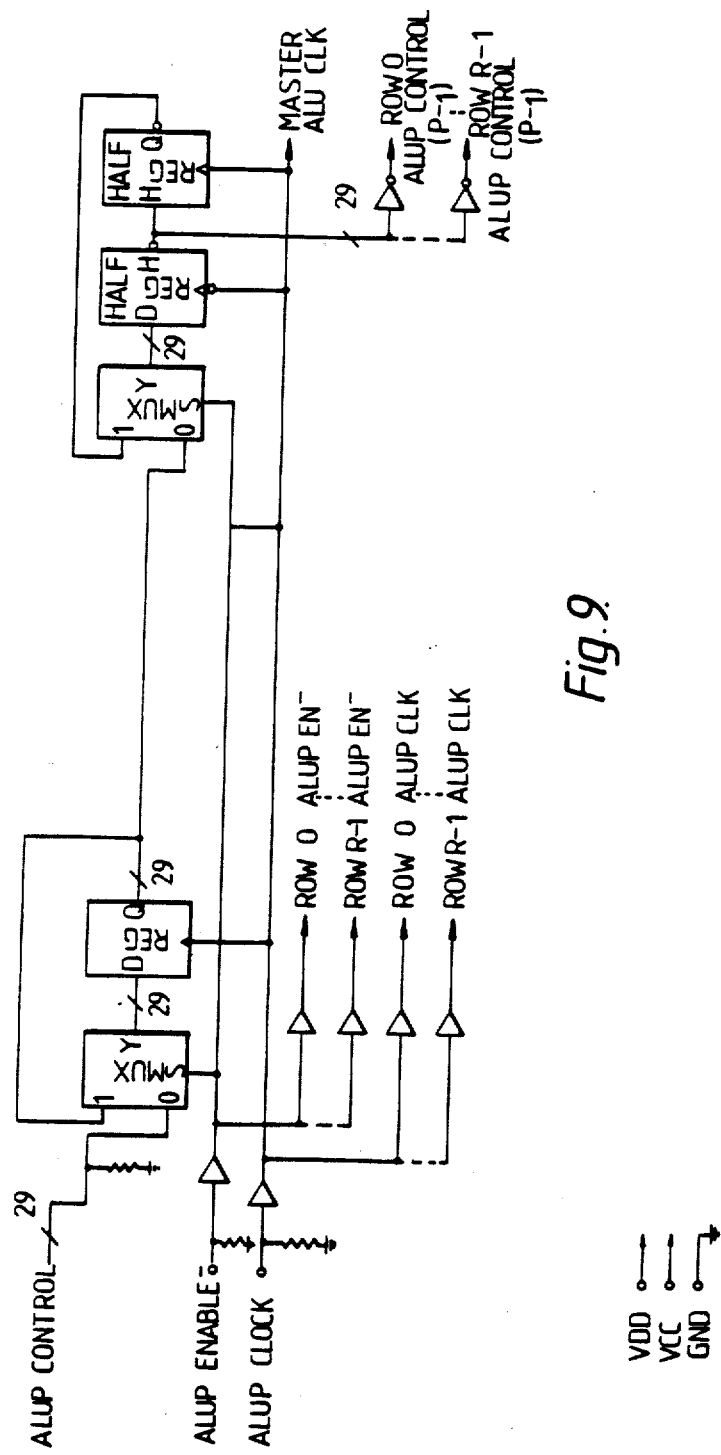
FIG. 9 is a diagram of the common logic instruction pipeline in an associative processor chip.
Figure 10:
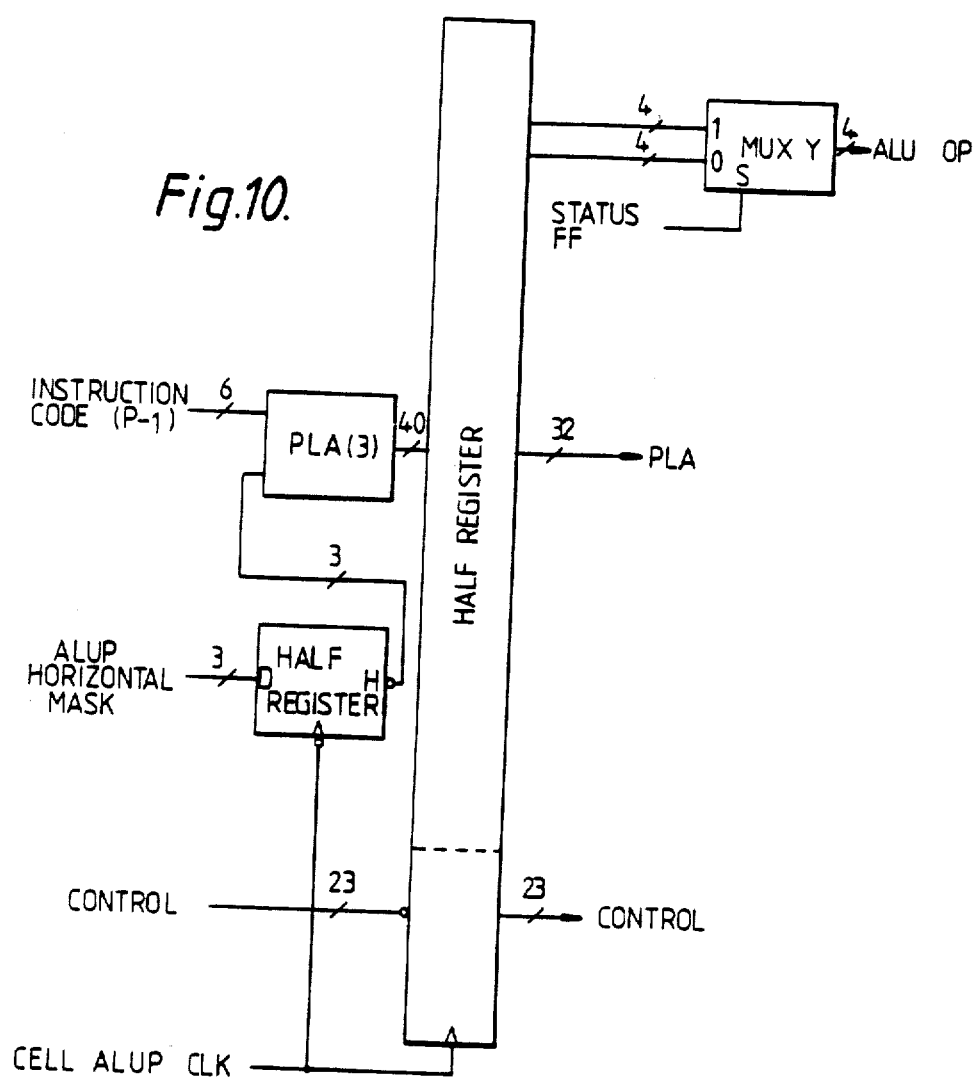
FIG. 10 is a diagram of the cell logic-arithmetic instruction programmable logic array.

The instruction pipeline consists of the common logic-instruction pipeline, shown in FIG. 9, and the cell logic-instruction PLA, shown in FIG. 10. The 29 ALUP Control signals must be stable immediately before the falling edge of the ALUP Clock. Most of the first clock period is thus available for the settling of these signals.

During the second clock period, the 29 ALUP Control signals are transmitted from the common logic to the cells and are fed to the cell instruction PLA inputs and multiport RAM address decoders.

The instruction is executed during the third clock period. Status, from a preceding cycle, modifies the output of the instruction PLA output register. Status can change every cycle and cannot be applied to the PLA inputs which are one cycle ahead of execution.

The three ALUP Horizontal Mask bits shown in FIG. 11 drive the PLA, thus care must be taken in the changing of the masks because a mask change effects instruction execution and the result is delayed by one clock cycle. The chip may either be fed a no-op using the Status Control signals, or the Configuration instruction, which is mask-independent, may follow a mask change.

3.2 Multiport RAM

The 64-word multiport RAM shown in FIG. 11 is conceptually divided into two halves. The lower, or user, half contains general purpose storage with no special inputs or outputs. The upper, or system, half contains many special inputs and outputs and provides many special functions. An example of address assignment is shown in Table 1. All of the bits have both read and write access within the cell.

The RAM has three ports. Two output ports, RAM A and RAM B, are addressed by the Read Address and the Read/Write Address respectively. RAM A goes to the ALU "A" input, and RAM B goes to the ALU "B" input. The RAM input port is also addressed by the Read/Write Address.

An operation of the form:

A OPERATION B→B read "A operation B goes to B", can be performed in a single cycle. The contents of A, selected by the Read Address, is operated on by B, selected by the Read/Write address, and is conditionally stored in B. Whether or not B is loaded is determined by ALUP Enable, Storage Enable, and Status Storage Enable, as described later.

Figure 6:
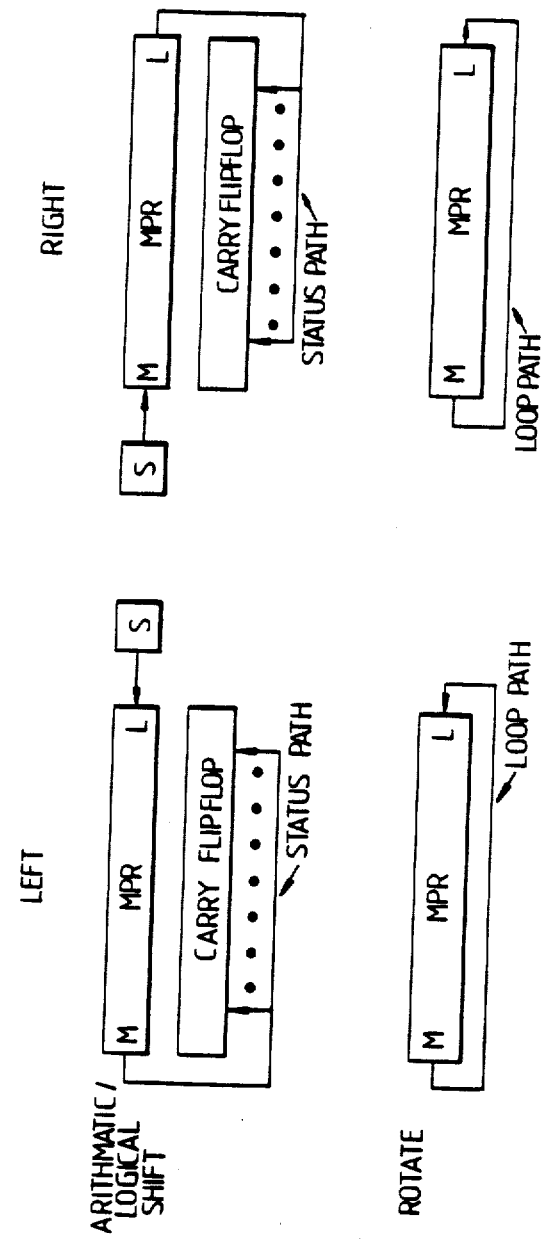
FIG. 6 shows single word shift structures.
Figure 7:
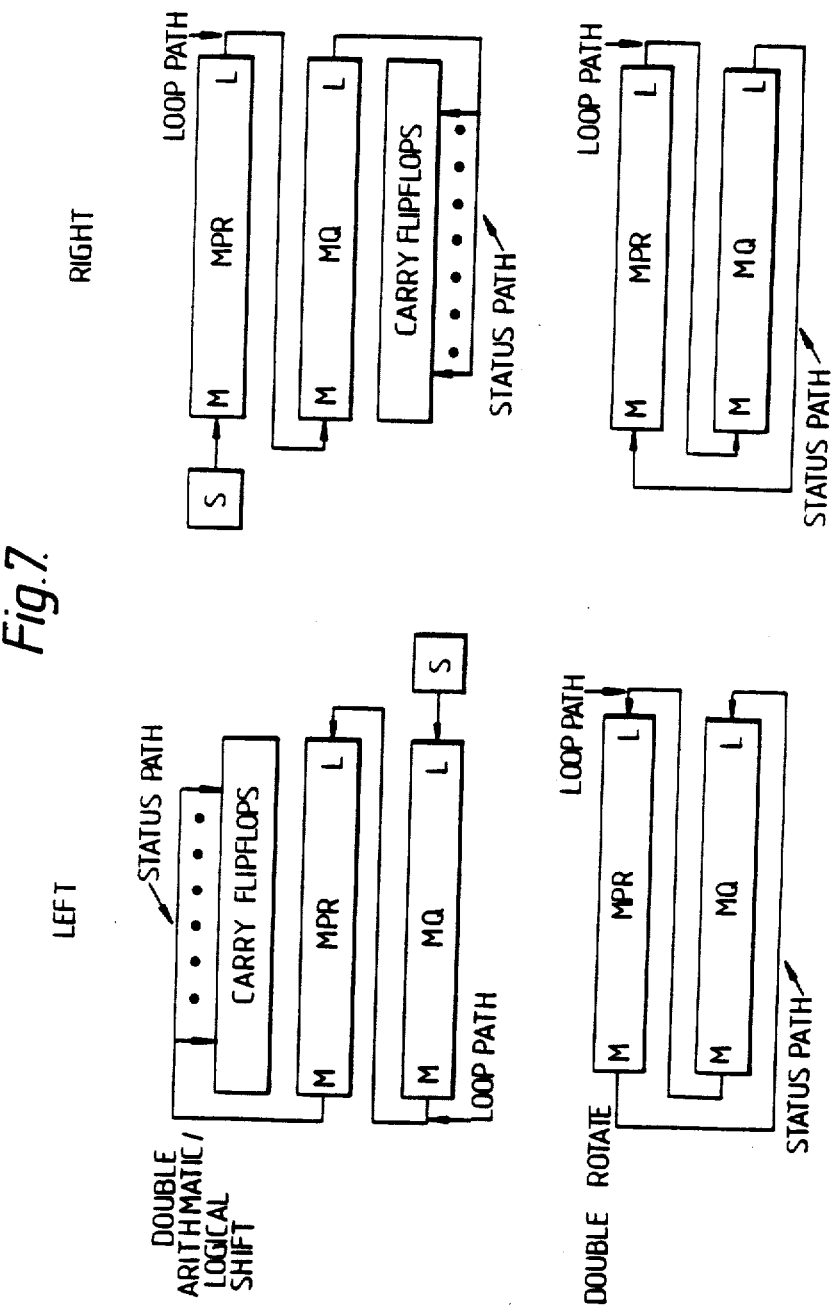
FIG. 7 shows double word shift structures.

The operations include an exhaustive set of arithmetic, logical, shift and rotate instructions. Single word shift structures are shown in FIG. 6, and double word shift structures are shown in FIG. 7. The instruction set is summarized in Tables 3–6.

The system half of the multiport RAM provides access to various input/output paths, plus status and configuration control bits. These bits are used as follows:

3.2.1. MQ

The MQ, multiplier/quotient, bit is used during multiply, divide, and double word shift and rotate instructions. This bit may be accessed independently of the Read and Read/Write Addresses through the MQ path.

3.22 MDR

The MDR, memory data register, connects the cell to external memory. The register may be accessed independently of the Read and Read/Write Addresses through the external memory path, and is controlled by the 2 MDR control signals, direction and strobe.

3.2.3 Status Register

The Carry, Negative, Zero, and Overflow bits comprise the Status Register. The inputs to each bit are the ALU D Bus, for use when the bit is selected by the Real/Write Address, and other sources as selected by the instruction PLA. PLA, and the writing into these bits is controlled separately from the writing into the location selected by the Read/Write Address. This independent control is provided through the status path.

The inputs to the status bits for the Arithmetic and Logical Instructions are: Carry bit—ALU carry out, Negative bit—ALU D BUS, Zero bit—Status Left/Right Multiplexer, Overflow bit—ALU Overflow. The Zero bit, actually the Not Zero bit, also called the Status Flipflop, is also used by all data-dependent instructions, such as multiply and divide, hence its meaning varies from instruction to instruction. The Zero Flipflop is inverted for the Arithmetic and Logic instructions being true when the result is NOT ZERO.

3.2.4 Sticky Overflow

The Sticky Overflow bit is controlled separately from the Status Register. It provides the logical OR of itself and the overflow flag, and may be used to provide a running check of whether or not an error condition occurred. It is typically loaded when the MSB of a word becomes valid, such as the last cycle of a multiply sequence.

3.2.5 Bus and Path

Four Registers, the Horizontal Bus, Vertical Bus, Down Path, and Up Path Registers provide input and output to the cell. Each register may be directly loaded from the bus that bears its name, and inversely, each bus may be driven directly from the register that bears the name of the bus. In addition, the registers provide three-address operations, i.e., A PLUS B→C, where C is one of the registers. Any one of these bits may be loaded from the ALU D BUS, independently of the Read/Write Address. The registers may also be bypassed so that a bus may be directly connected to an input of the ALU, leaving the register contents unchanged. This direct input, along with a direct output from the ALU, provides results that accumulate from one row to the next, so called "broadside operations", as will be explained later. The registers are controlled by the Input/Output Function and the Input/Output Select signals, which are part of the Data Path Control signals.

3.2.6 Impedance Restoration Mask

The Impedance Restoration Mask is used by the five arithmetic paths to minimize signal propagation across a chip. It is expected to reduce the delay across the chip by 50% and has no special inputs. Its use in the carry path is the subject of a previous patent application #452, 592 filed Dec. 23, 1982 by S. G. Morton.

3.2.7 ALUP Horizontal Masks

The 3 ALUP Horizontal Masks organize cells into words. See "Slice Types".

3.2.8 ALUP Vertical Masks

The 3 ALUP Vertical Masks control the flow of information on the Up and Down paths. Masks 0 and 1 are decoded to control the information fed into a row, and Mask 2 selects the data that is sent out of a row. See Table 2. Setting ALUP Vertical Mask 2 true allows the output of the ALU to be the output of a row, and the use of the Direct Input instruction allows that output to be the input to the ALU of the next row. These are multiple row, or "broadside", operations. Multiple rows may thus operate on data that accumulates across the rows. The sum of data from all the rows may thus be computed in a single cycle. In addition, data my flow up or down, as chosen by the Input/Output Select signals.

3.3. Arithmetic and Logic Unit

The Arithmetic and Logic Unit (ALU) provides seven arithmetic, seven logic, and two constant functions. These are identified in Table 3 and the first seven instructions in Table 4. These functions are executed explicitly by the logical instructions and by some of the Arithmetic instructions, and are executed implicitly by the other instructions.

3.4. Horizontal Data Paths

There are five primary horizontal data paths between adjacent cells. These five, the ALU, Carry, MQ, Loop, and Status, Paths support arithmetic operations. The paths are fundamental to the operation of the chip, and provide the ability to have arbitrary word sizes, spanning the rage of multiple words per chip, to multiple chips per word. These paths are brought out of the chip from each row from the left of the left-most column and the right of the right-most column. The operation of four, ALU, MQ, Loop, and Status, of these paths is bidirectional and depends upon Transversal Horizontal Multiplexers. The carry path is unidirectional and is described in the patent application entitled "Impedance Restoration for Fast Carry Propagation" by S. G. Morton.

A basic problem in providing aribitrary word sizes is how to connect the opposite ends of words together. In a conventional, fixed word size computer, a single wire connects the MSS to the LSS. This connection is used for single word operations, such as rotate, and double word operations, such as multiply and divide. A single 16-bit AP chip would need hundreds of wires if every possible MSS were directly tied to every possible LSS. Not only is the word size arbitrary, but the position of that word can be arbitrarily located in a sequence of cells. Further compounding the problem is the requirement of being able to connect an arbitray number of AP chips together to form arrays of various sizes, so the number of possible interconnections is large.

5.4.1 Transversal Horizontal Multiplexer

A Transversal Horizontal Multiplexer moves a bit from a cell to its left or right neighbor, or moves a bit from the left or right neighbor to the other neighbor, bypassing the cell. A series of cells may thus be arbitrarily divided into words by selecting some multiplexers to connect groups of bits forming the body of a word, and multiplexers in other cells to form boundary bits, i.e., at the LSS and the MSS, separating words. The instruction PLA uses the ALUP Horizontal Masks, which identify slice types, and the instruction code, to properly control the various horizontal multiplexers.

Figure 12:
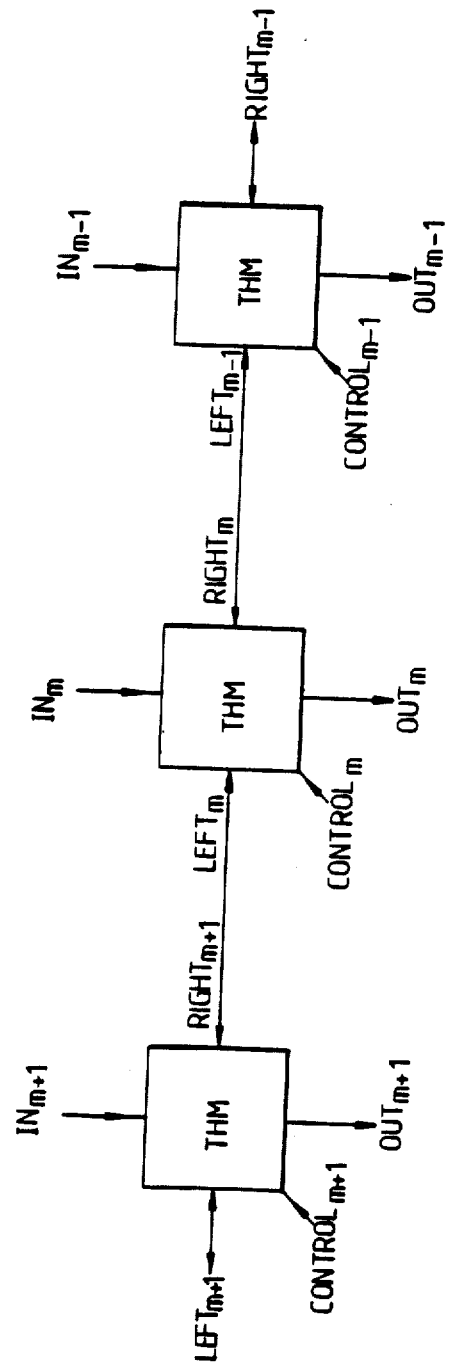
FIG. 12 shows a linear array of Transversal Horizontal Multiplexers.

The primary implementation of the Transversal Horizontal Multiplexer is in MOS (metal oxide semiconductor) or CMOS (complementing MOS) integrated circuits. The invention is intended for use in an array of like devices, or cells and facilitates the communication between three adjacent devices. See FIG. 12. Note that the Left signal from the center Transversal Horizontal Multiplexer, cell M, goes to the Right signal of cell M+1, and that the Right signal from cell M goes to the Left signal of cell M−1.

Figure 13:
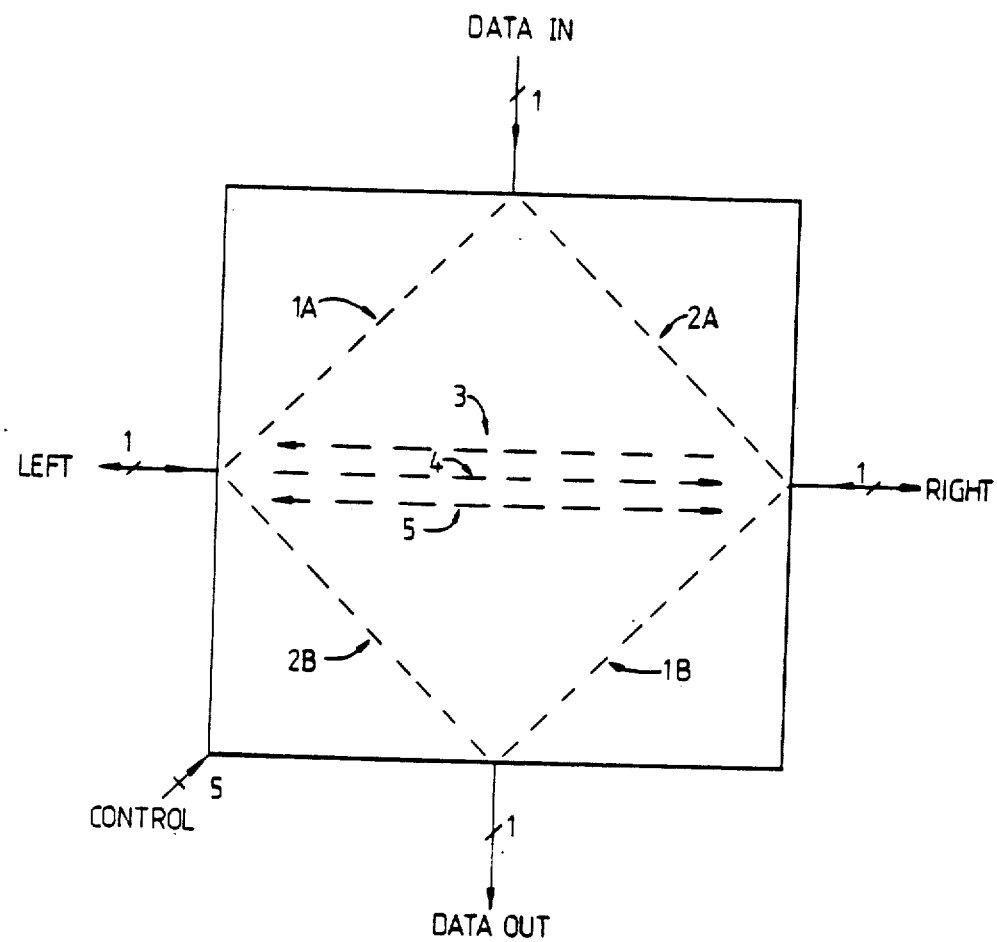
FIG. 13 shows data flows in a Transversal Horizontal Multiplexers.

FIG. 13 shows the data flows that are possible with a Transversal Horizontal Multiplexer. Each multiplexer has four signal nodes, each providing a single-bit path, and control inputs. There is an unidirectional input, Data In, and a unidirectional output, Data Out. The Left signal path to the Right signal of the left neighbor, and the Right signal path, to the Left signal of the right neighbor, are bidirectional. Five data flows are possible, as chosen by the control input:

1. From cell M to cell M+: path 1A connects Data In to Left, and path 2B connects Right to Data Out
2. From cell M to cell M+1: path 2A connects Data In to Right, and path 2B connects Left to Data Out
3. From cell M−1 to cell M+1: path 3 provides a unidirectional connection from Right to Left; and path 1B provides a connection from Right to Data Out
4. From cell M+1 to cell M−1: path 4 provides a unidirectional connection from Left to Right, and path 2B provides a connection from Left to Data Out.
5. Between cell M+1 and cell M−1: path 5 provides a bidirectional connection between Left and Right The power of the Transversal Horizontal Multiplexer is that it allows regular structures to be built that provide arbitrary word sizes while requiring data connections only between adjacent cells. In addition, data in a cell can be left out of an operation, and furthermore, the number of connections between cells is minimized, without resorting to time division multiplexing of connections.

Figure 14:
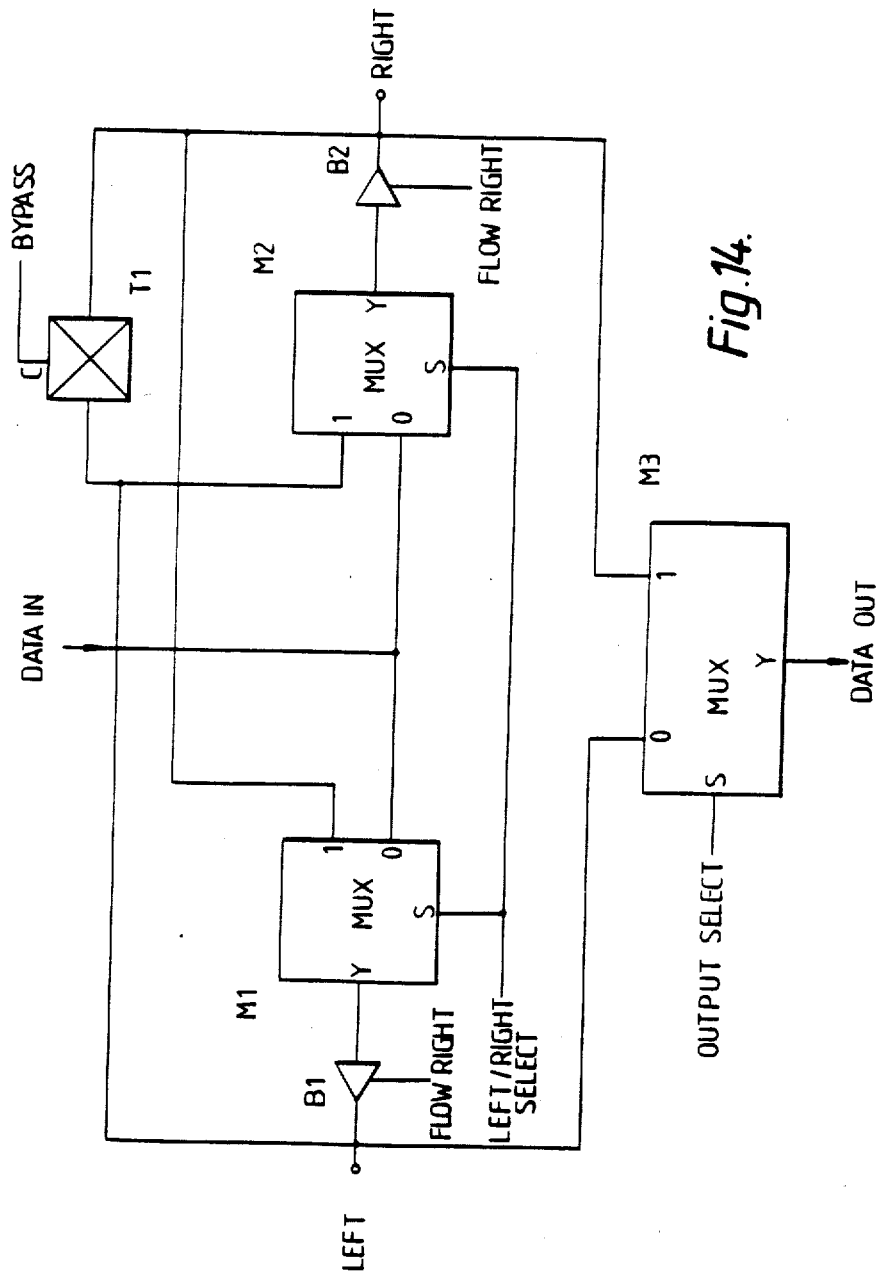
FIG. 14 shows a detailed view of a Transversal Horizontal Multiplexer.

The Transversal Horizontal Multiplexer is composed of three two-input multiplexers, two tri-state buffers, and a bidirectional transmission gate. Multiplexer M3 is called the "Left/Right Multiplexer" because it selects between the Left and Right signals. Only a single connection to each of the left and right neighbors is required. See FIG. 14.

Figure 15:
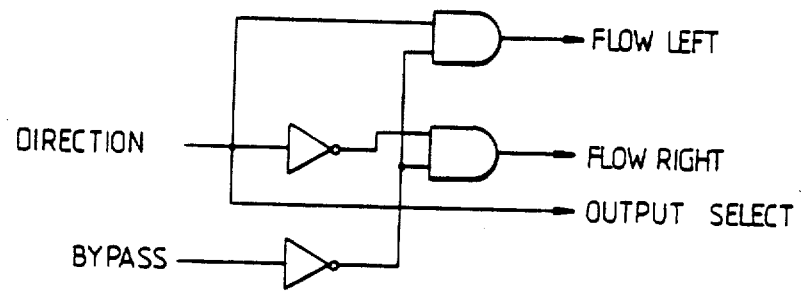
FIG. 15 shows a control signal simplification circuit.

There are five control signals, Bypass, Left/Right Select, Output Select, Flow Left and Flow Right. The logic in FIG. 15 allows the use of only three control signals, with Flow Left, Flow Right and Output Select being generated from Direction. Use of this logic has been assumed in the preceding discussion, and results in Data In flowing to either Left or Right, but not both simultaneously, and Data Out coming from incoming data on Left or Right rather than coming from outgoing data.

In the following discussions, the following definitions are used:

1. Transmission gate—input and output are interchangeable, with high impedance between input and output when the control line is false; and relatively low impedance between input and output when the control line is true.
2. Buffer—output follows input, with a low impedance to power or ground when control line is true; high impedance output when control line is false.
3. Two-input multiplexer—output, Y, follows input "0" when Select line is false; output follows input "1" when Select line is true.

The detailed operation of the Transversal Horizontal Multiplexer is as follows:

1. Data flow from Data In to Left: Bypass at T1 is set false. Left/Right Select is set false to select Data In, Flow Left is set true so that the Left pin receives the selected data from M1, and Flow Right is set false so that data may come from the Right. Output Select is set true so that data at Right is sent to Data out at M3.
2. Data flow from Data In to Right: This is the same as case 1, except that Flow Right is true, Flow Left is false, and Output Select is false.
3. Data flow from Right to Left: Bypass is set false and Data In is irrelevant. Left/Right Select is set true so that data at Left flows to the M2 output. Flow Right is set true so that the M2 output flows through B2 to Right. Flow Left is set false, and Output Select is set false so that the driving input flows through M3 to Data Out.
4. Data flow Left to Right: This is the same as case 3, except Flow Left is true, Flow Right is false, and Output Select is true.
5. Data flow between Left Cell and Right Cell: Input Select, Output Select, and Receive Select are irrelevant. Flow Left and Flow Right are set false. Bypass is set true so that a bidirectional, relatively low impedance connection is established between Left and Right. This is the state that is used when a cell is faulty since the minimum amount of logic must work in order for data to flow across a cell.

Another feature of the invention is that it allows the dynamic construction of minimum propagation delay paths. One notes that a signal must flow thrugh a collection of Transversal Horizontal Multiplexers in order to get from one end of a word to the other, such as in a state left or state right instruction. There are two ways for a signal to cross a cell, through the multiplexer and buffer (M1 and B1 or M2 and B2 in FIG. 14, or through the transmission gate (T1 in FIG. 14.).

A difficulty is the relatively high impedance of the transmission gate even in the active state. As the number of multiplexers through which data is propagated increases, the distributed capacitance, along with the increasing impedance of the string of tranmission gates, slows down circuit operation.

Figure 16B:
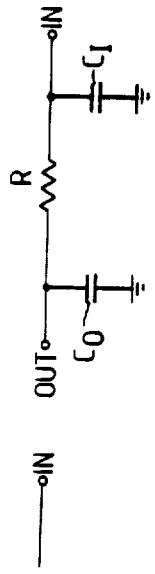
FIGS. 16A and 16B shows transmission gate representations.
Figure 16A:
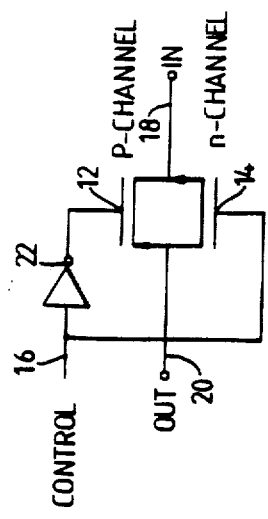

FIG. 16A shows a schematic representation of a CMOS transmission gate. The transmission gate is built from two series pass transistors, one p-channel and one n-channel. When the Control line is high, either one of the transistors may conduct, depending upon the state of the Input signal, presenting a relatively low impedance path from input to output, and the gate is considered active. When the Control line is low, both transistors are off, and the Input is disconnected from the Output.

FIG. 16B shows a lumped circuit model of a transmission gate. For an active CMOS gate with minimum geometry, 4u design rules, with the circuit operating at 5 volts, $C_0 + C_1 = 0.5$ pF and $R = 1K$ ohm, approximately.

Figure 17:
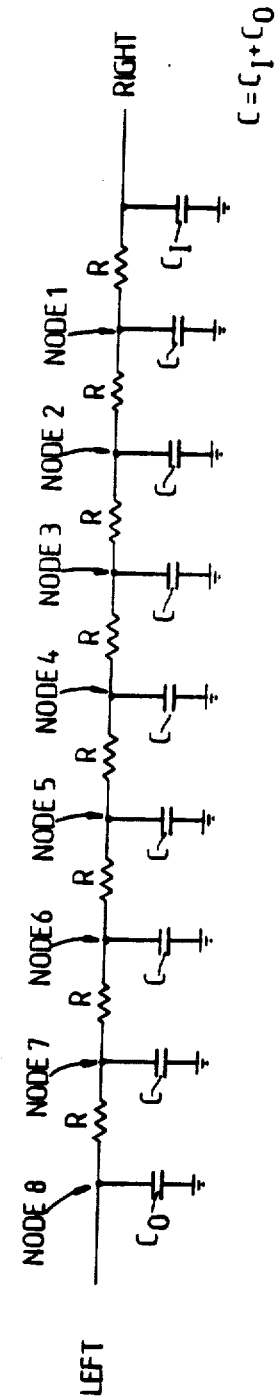
FIG. 17 shows a simplified equivalent circuit for a series of transmission gates.

FIG. 17 shows a collection of these lumped circuit models in series, as in the case of a long, end-to-end chain. The resistive impedance to charge C at Node 1 is R plus S, where S is the source impedance. Likewise, the resistive impedance to charge C at Node 4 is 4R plus S, and so on. Thus the circuit speed decreases at the number of transmission gates in series increases.

If each transmission gate is replaced by a buffer, there is a constant impedance to drive each node, but the propagation delay through a buffer is much longer than through an isolated transmission gate. Some combination of transmission gates and buffer must thus be found to provide the optimum performance.

Propagation delay times for a minimum geometry, 4u design rule, CMOS process, with the circuit operating at 5 volts with minimal loading is approximately as follows:

1. Multiplexer and buffer—10 ns
2. Transmission gate—(3+N)ns, for small values of N, where N is the index of the gate in a string of gates.

Thus, four Transversal Horizontal Multiplexer in series would have a propagation delay of 40 ns for four buffers in series, or only 22 ns for three transmission gates and one buffer in series. The circuit may thus run nearly twice as fast using a combination of transmission gates and buffers as using only buffers. One thus chooses the path through the buffer, in order to provide a low impedance signal, whenever parasitic delays outweigh the benefit of the transmission gate connection.

In general, a set of values for the Bypass, Flow Left, and Flow Right signals is chosen to minimize the propagation time. The choice depends upon the circuit fabrication technique, interface considerations between calls (which may be on different chips), and upon the word size. It is assumed in the previous example that only every fourth buffer may need to be activated, leaving the three intervening transmission gates potentially active.

The Impedance Restoration Mask is set time by the programmer in those cells where the use of a buffer, rather than a transmission gate, is desired. If the instruction PLA specifies that a connector from Left to Right, or Right to Left, is required, and the Impedance Restoration Mask is false, then the Bypass signal is set true, and the Flow Left and Flow Right signals are set false. The transmission gate is thus used. Similarly, if the Impedance Restoration Mask is true, then Bypass is set false and the buffer that is enabled by Flow Left or Flow Right is used. Likewise, if data in a cell is to be left out of an operation, Bypass can be set time and Flow Left and Flow Right are set false.

3.4.1 Path Usage

The implementation of dynamic word size configuration recognizes that only five horizontal paths between adjacent cells are required to support an extensive instruction set. The paths are used as follows:

Carry—propagate the arithmetic carry from the ALU Carry Output to the left, or move the carry from the right to the left.

ALU—move a bit from one cell to the next. The movement may be to the left, to the right, from the right to the left, or from the left to the right. The typical input to this path is the ALU C Bus, i.e., the ALU output, and the typical destination is the multiport RAM.

MQ—multiplier/quotient—move a bit from one cell to the next. The movement may be to the left, to the right, from the right to the left, or from the left to the right. The typical input to this path is the MQ flipflop, and the typical destination is the MQ flipflop.

Loop—move a bit from one cell to the next. The typical input to this path is the ALU C Bus, i.e., the ALU output, and the typical destination is the MQ flipflop. This path usually provides end-to-end coupling in double word operations.

Status—move a bit from one cell to the next. The movement may be to the left, to the right, from the right to the left, or from the left to the right. In addition, horizontal OR and XOR operations may be performed, using logic outside of the transversal horizontal multiplexer, so that one may perform a zero check or a parity computation on an entire word in a single operation. The typical input to the path is the ALU D Bus, and the typical destination is the set of Status flipflops. Unlike the other paths where a single flipflop is the usual destination, the Status Path is widely used, as in the Multiply and Divide instructions, to transmit a single status bit to all Status flipflops in the word so that the slices may perform in a coordinated manner.

Figure 18:
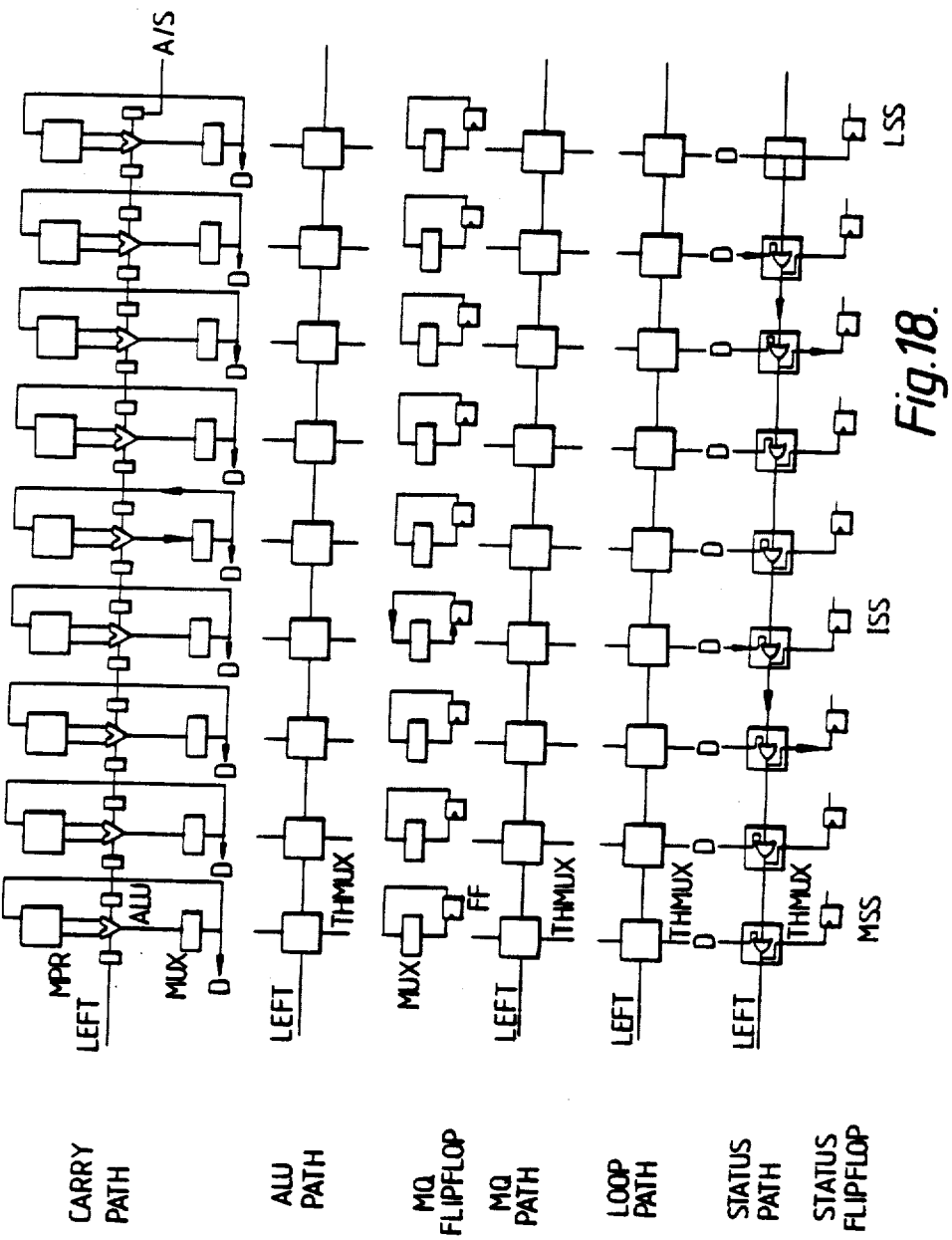
FIG. 18 illustrates signal path usage in an associative processor performing an Add instruction.

The usage of the paths in key instructions is shown in FIGS. 18-25. The terminology used in these figures is as follows:

A/S—determined by Serial Input Select lines
A—output of ALU Left/Right Multiplexer
D—ALU D Bus
L—output of Loop Left/Right Multiplexer
M—output of MQ Left/Right Multiplexer
S—output of Status Left/Right Multiplexer
MPR—multiport RAM
MUX—multiplexer
THMUX—transversal horizontal multiplexer
MUL MSB—multiplier most significant bit FIG. 18 shows the path usage in the ADD instruction. The Carry path moves the ALU carry output of each slice except the MSS to the next slice to the left. The Status path with OR gates external to the Transversal Horizontal Multiplexes, provides a running OR of each bit of the SUM, from right to left, so that the Zero/Status flipflop in the MSS is false only if all bits of the SUM are false. The carry into the LSS is selected by the Serial Input Select lines, which choose among zero, one, and others.

Figure 19:
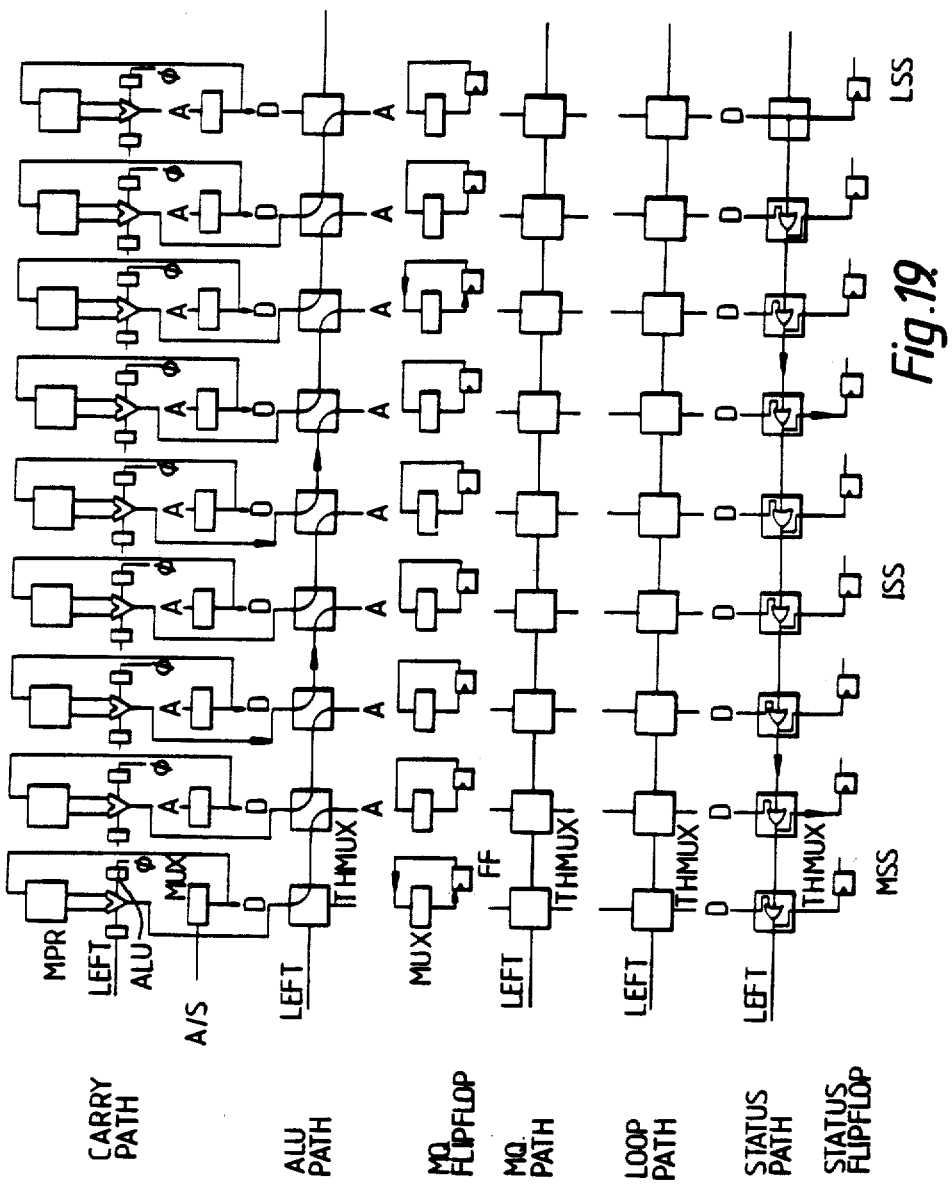
FIG. 19 illustrates signal path usage in an associative processor performing an arithmetic/logical shift right instruction.

FIG. 19 shows the path usage in the ARITHMETIC/LOGICAL SHIFT RIGHT instruction. The ALU path carries the ALU C Bus of each slice except the LSS one bit to the right where it is stored in the multiport RAM. The Status path carries the bit shifted out of the LSS to all Status flipflops for use in multiple word shifts. The input to the MSS is chosen by the Serial Input Select lines, which select among 0 and the ALU C Bus, the latter for replicating the sign bit in arithmetic shifts.

Figure 20:
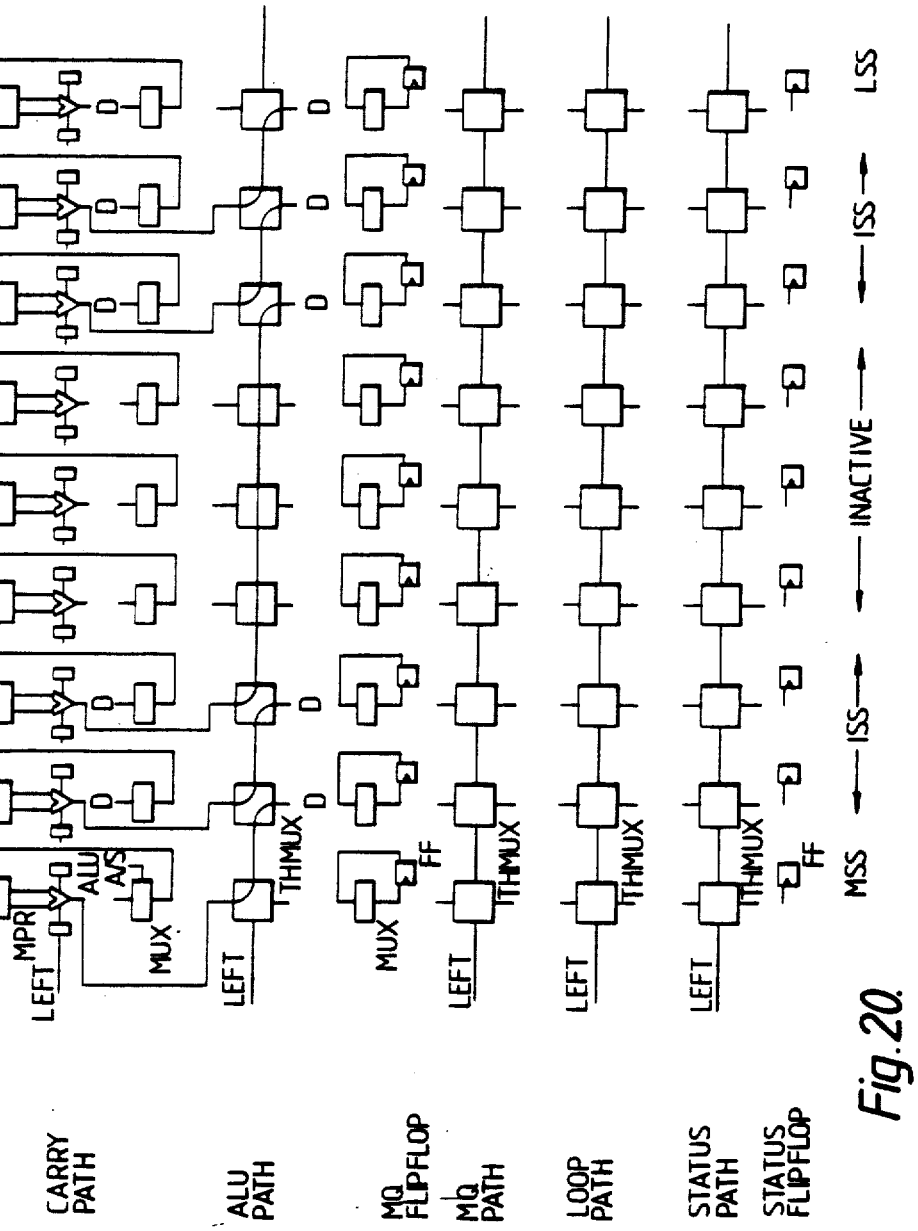
FIG. 20 illustrates signal path usage in an associate processor performing a skip over field in an intermediate portion of a word operation.

FIG. 20 shows the path usage in an example of a Skip Over Field operation. An ARITHMETIC/LOGICAL RIGHT SHIFT instruction is executed, but cells in the middle of the word are set to the Inactive state. Data from the third cell to the left flows on the ALU path past three Inactive cells and is stored in the third cell from the right. The number of cells in the Inactive state, the slice type of source and sink cell, and the direction of data flow, are all arbitrary.

Figure 21:
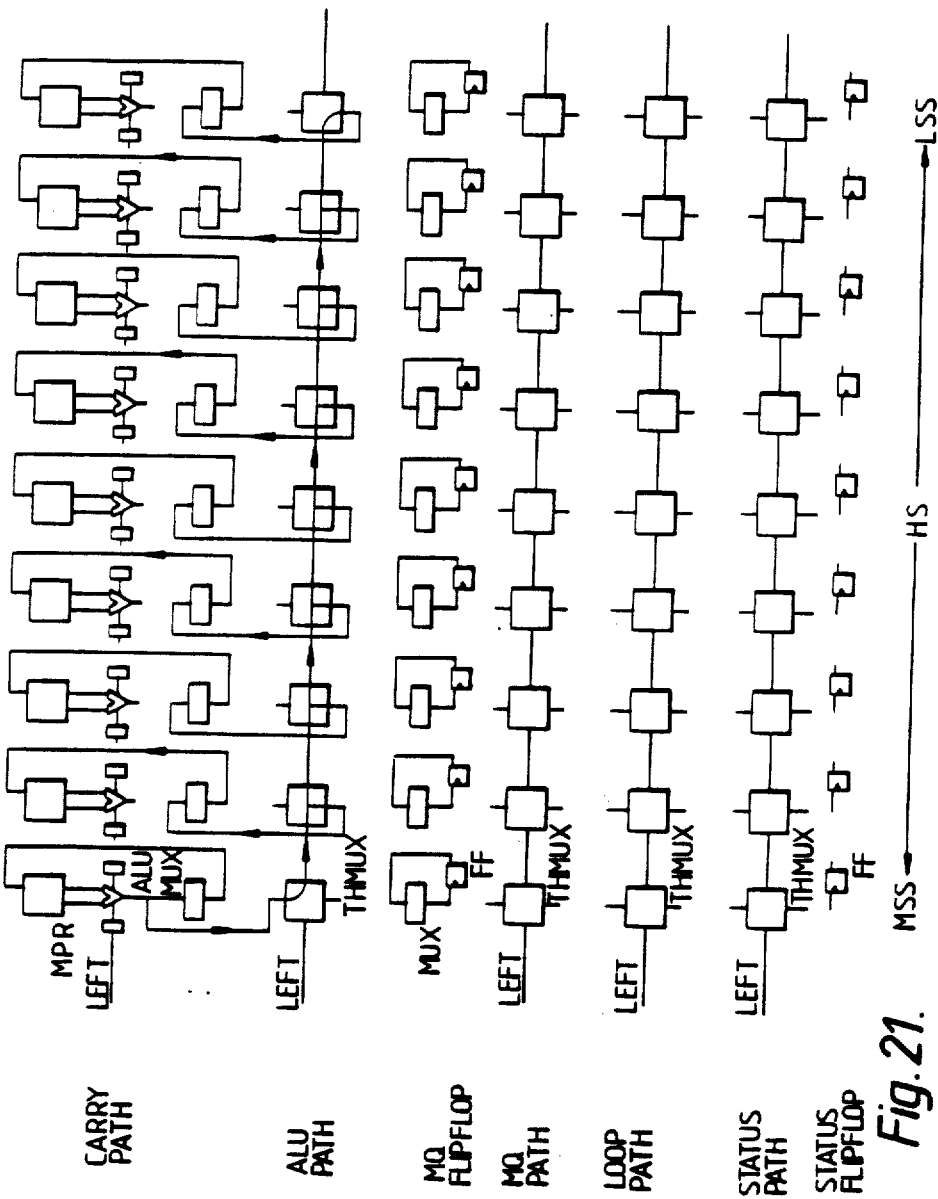
FIG. 21 illustrates signal path usage in an associative processor performing a sign extension operation.

FIG. 21 shows the path usage in an example of an operation using Horizontal Skip. When all cells except the MSS and LSS are set to the Horizontal Skip state and an ARITHMETIC/LOGICAL RIGHT SHIFT instruction is executed, the bit from the MSS flows via the ALU path to, and is stored in, all other cells in the word.

Figure 22:
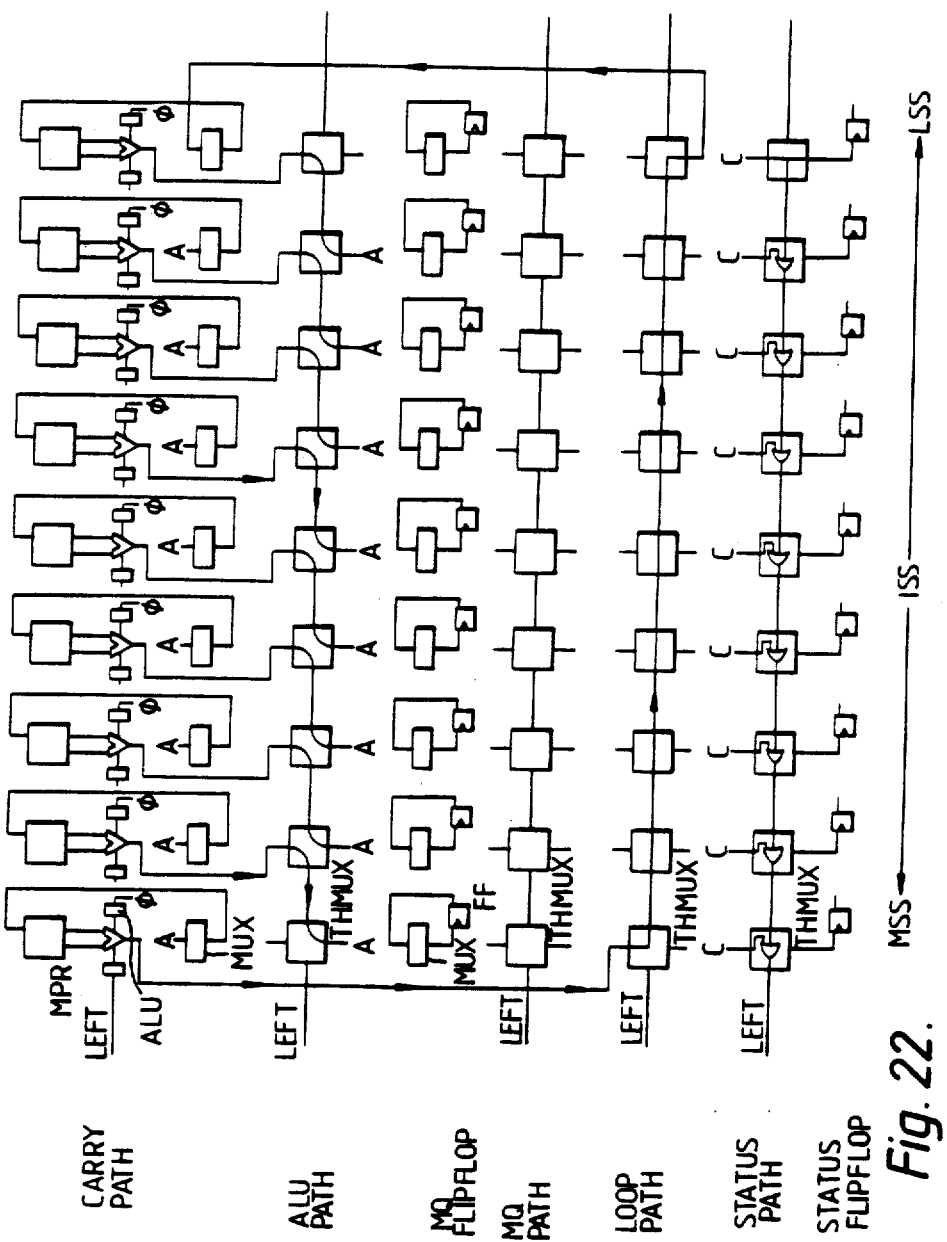
FIG. 22 shows path usage in an associative processor performing a rotate left instruction.

FIG. 22 shows the path usage in the ROTATE LEFT instruction. The Read Address selects a location in the Multiport RAM. The contents of the location, in the LSS and all ISS's, is shifted one bit to the left via the ALU path. The contents of the location in the MSS is entered into the loop path which carries it to the LSS. The shifted data is written into the multiport RAM at the location selected by the Read/Write Address.

Figure 23:
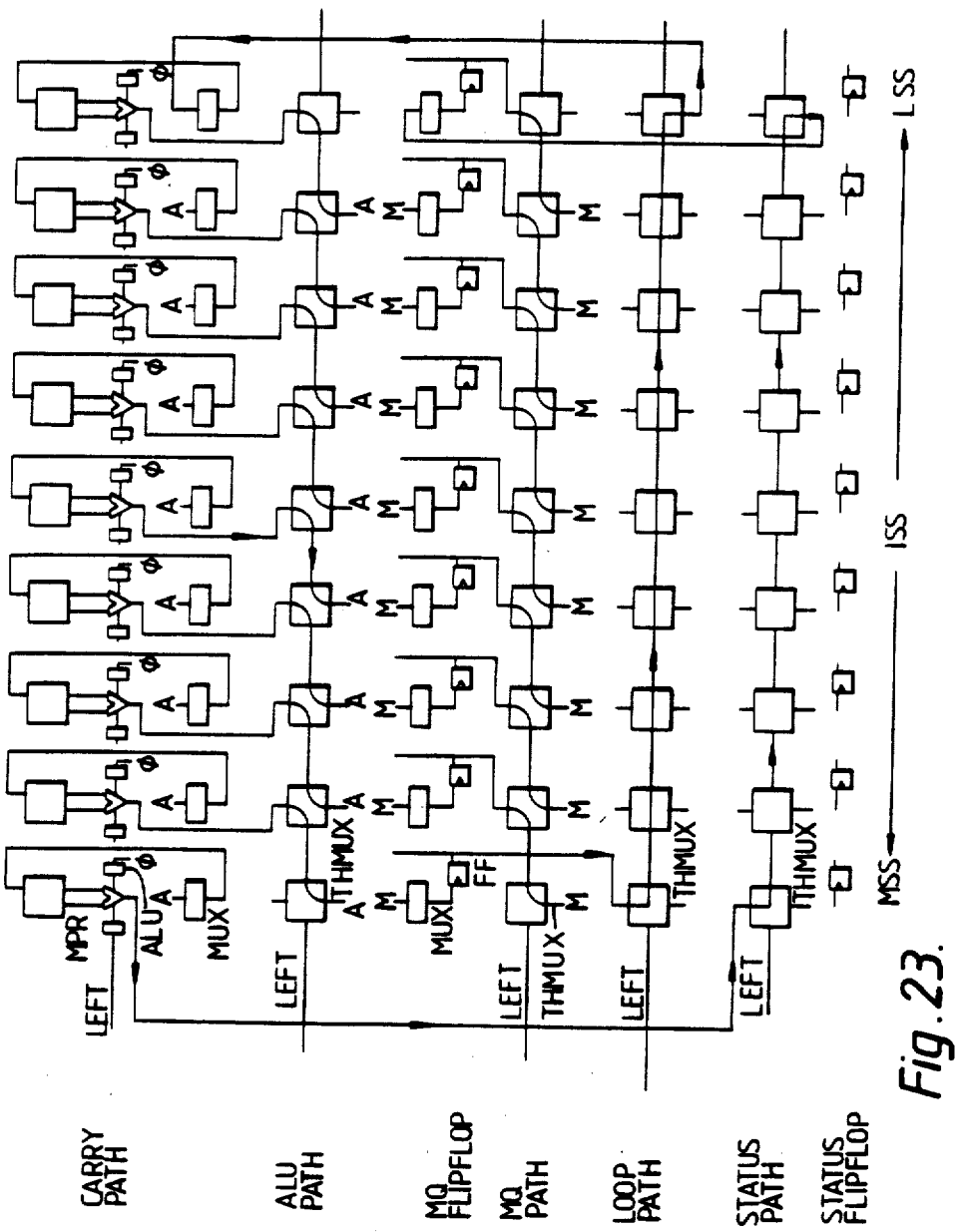
FIG. 23 illustrates signal path usage in an associative processor performing a double rotate left instruction.

FIG. 23 shows the path usage in the DOUBLE ROTATE LEFT instruction. The operation is similar to ROTATE LEFT, except that a pair of words is shifted. The word in the location in the multiport RAM selected by the Read Address is shifted one bit left via the ALU path where the bit shifted out of the MSS is entered into the LSS of a special location in the multiport RAM, the MQ register, via the Status path. The MQ register is shifted one bit to the left via the MQ path, and the bit shifted out of the MSS is entered into the LSS of the location selected by the Read Address via the Loop path.

Figure 24:
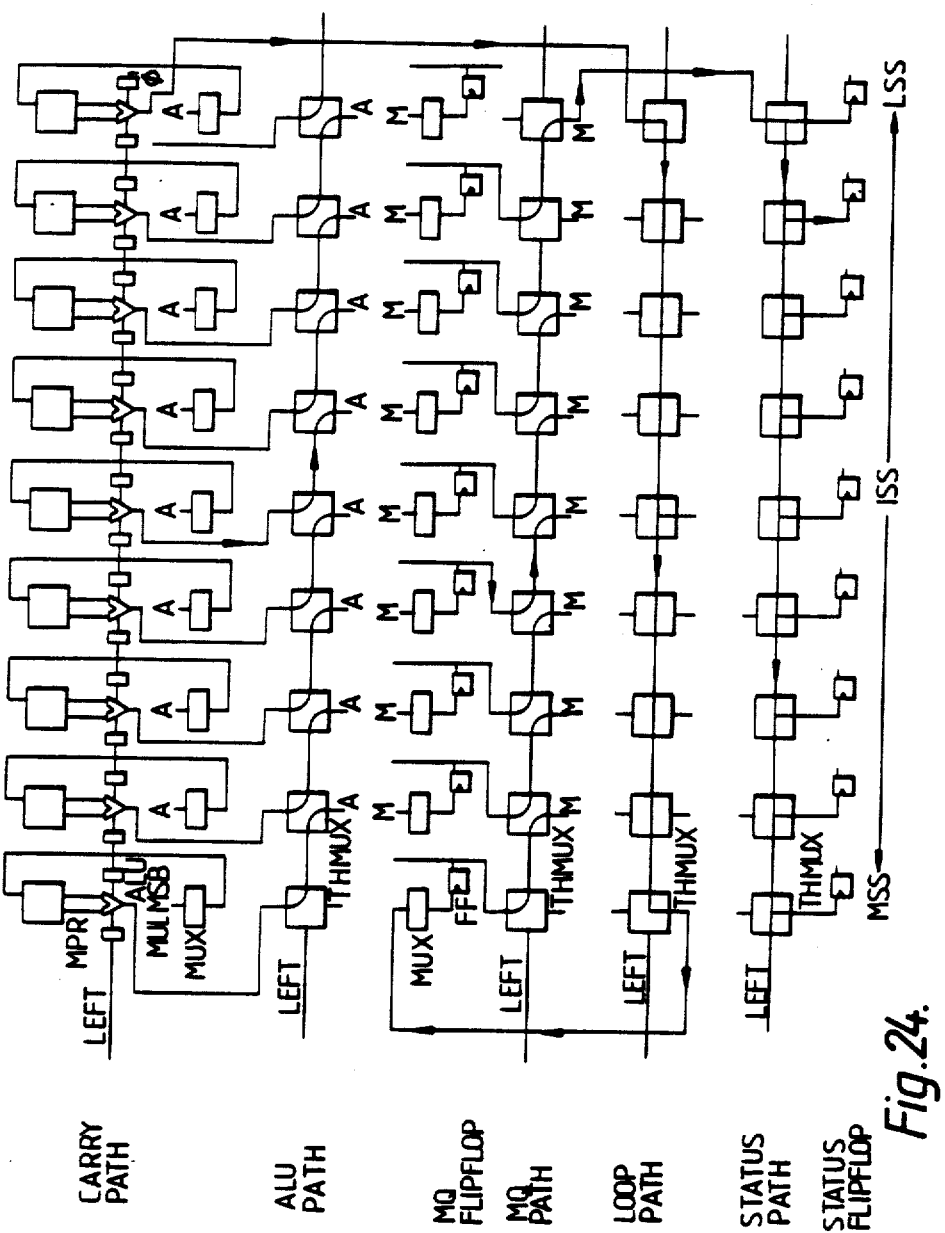
FIG. 24 illustrates signal path usage in an associative processor performing a fixed multiply intermediate instruction.

FIG. 24 shows the path usage in the MULTIPLY INTERMEDIATE instruction. The algorithm used is to add the multiplicand to the partial product if the current lsb of the multiplier is true. The partial product is then shifted one bit to the right, along with the multiplier. The Status flipflop determines whether or not to add the multiplicand to the partial product. The Carry path moves the ALU carry output of each slice except the MSS to the next slice to the left. The ALU path moves each bit of the partial product sum one bit to the right, except for the MSS which gets the multiplier MSB, the sign bit which has been corrected for overflow. The shifted sum is loaded into the multiport RAM. The MQ path moves each bit of the multiplier, in the MQ flipflop, one bit to the right, except for the MSS. The shifted result is loaded into the MQ flipflop. The Loop path moves the partial product sum in the LSS, past the other slices, to the MSS of the MQ flipflop. The Status flipflop in the LSS receives the multiplier bit being shifted from the MQ flipflop second LSS. The Status path carries that same bit, from the MQ flipflop second LSS, to the left to all Status flipflops other than in the LSS. This status bit is used in the following cycle. The instruction is executed for each bit of the multiplier except the last bit when the data is in 2's complement notation.

Figure 25:
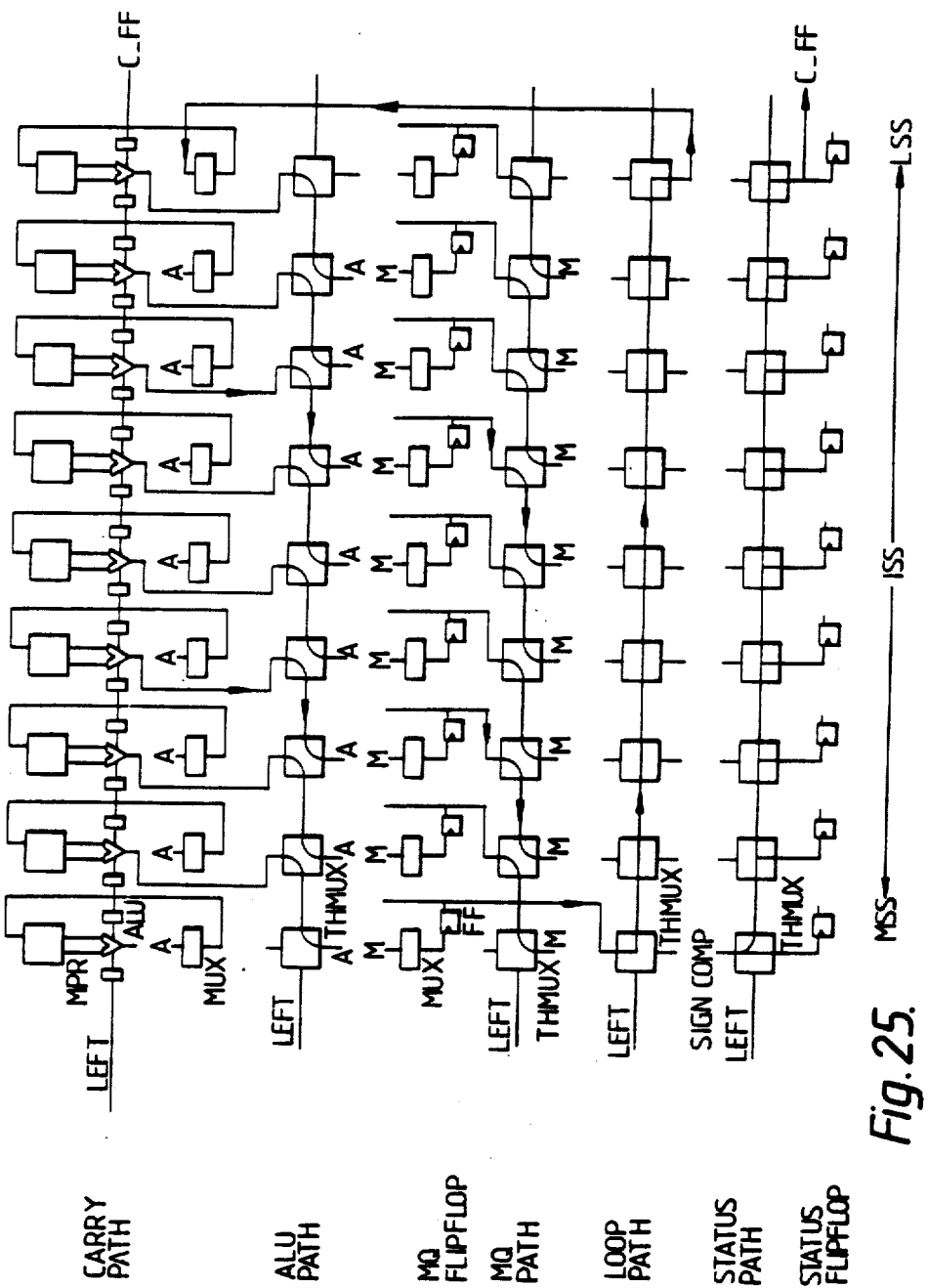
FIG. 25 illustrates signal usage in an associative processor performing a fixed divide intermediate instruction.

FIG. 25 shows the path usage for the DIVIDE INTERMEDIATE Instruction. The algorithm used is non-restoring division. The ALU operation depends upon the status flipflop which stores the outcome of the previous cycle. The ALU path shifts the partial remainder, initially the most significant half of the numerator, one bit to the left, while the MQ path shifts the least significant half of the numerator, and eventually the quotient, one bit to the left. The halves of the numerator are tied together by the Loop path. The Status path conveys the sign comparison from the MSS to all slices of storage in the Status Register and use in the following cycle. Sign compare determines whether the denominator should be added or subtracted from the partial remainder.

3.5. Horizontal Busses

The Horizontal Bus and the ORed Bus are connected in parallel to all cells in a row and are brought of the chip.

The Horizontal Bus is bidirectional and may be loaded directly into the Horizontal Bus Flipflop in each cell, or may be used directly as an input to the ALU. The Horizontal Bus may be driven by the Horizontal Bus Flipflop in a selected cell. One cell per row is selected by asserting the Vertical Bus line connected to that cell. The Input/Output Function and Input/Output Select lines control the operation of the Horizontal Bus.

The ORed Bus, which produces an inverted output, is unidirectional. The output is intended to be ORed with the like outputs of other chips in the row, where the OR is performed by a gate, not a wired OR. The driver is always enabled. One or more cells drive the bus, which is internally open collector, when one or more Vertical Bus lines are asserted. The source of data for the bus is the Horizontal Bus Flipflop.

3.6. Vertical Connections

There are three vertical paths between cells, the Up path, the Down path and the Vertical Bus. Within an AP chip, the Vertical Bus is connected in parallel to all cells in a column, and the Up and Down paths connect all cells in serial in a column.

The operation of these paths is controlled by the Input/Output Function and the Input/Out Select pins. Each path may be driven by a specific bit in the multiport RAM, and each path may be directly loaded into that bit or may be directly connected into the input of the ALU, under control of the Read Address and the Read/Write Address. In addition, the loading of the multiport RAM bits that drive the paths is controlled separately from the Read/Write Address, and provides a three-address mechanism, making possible operations of the form:

A OPERATION B→C where C is one of the Vertical Bus Register, the Up Register, or the Down Register.

Separate registers, i.e., multiport RAM bits, have been provided for the Up and Down paths to speed the alternate movement of data both up and down.

Each row of the chip has a small amount of logic that is used in common. Bidirectional buffers are provided for the Horizontal Bus. The Horizontal Bus output buffer is enabled when the Input/Output Select and Input/Output Function lines are in the Horizontal Bus Output Enable state, and when any Vertical Bus line is asserted. Only one cell may drive the input to the buffer at one time. The Horizontal Bus input buffer is enabled when the Input/Output Select and Input/Output Function lines are not in the Horizontal Bus Output Enable state.

Each column of the chip has a common bidirectional buffer. The output buffer is enabled when the Input/Output Select and Input/Output Function lines are in the Vertical Bus Output Enable state, and when any Horizontal Bus is asserted. The input buffer is enabled when the Input/Output Select and Input/Output Function lines are not in the Vertical Bus Output Enable state.

3.7 Instruction Programmable Logic Array

Each cell is individually configured by its own set of masks, hence each cell much have its own instruction decoder. This decoder is a programmable logic array (PLA), which is a regular structure that facilitates the redefinition, or correction, of functions. There is a small number of inputs, ten, but a relatively large number of outputs, 40, only a few of which are usually active at one time. The instruction opcodes, slice enumerations, and internal multiplexer select codes have all been chosen to minimize the size of the PLA. The more an input to a multiplexer is used, the fewer are the number of ones in its select code.

The Status Flipflop modifies some of the PLA outputs so that instructions can be data dependent. The architecture is relatively simple in that only the choice of ALU operation is data dependent; the path operation is not affected. The instructions which implement multiplication and division make use of this data dependent feature and have an implementation that is specially tailored for fast operation.

The ALU OP multiplexer in FIG. 10 chooses one of the two sets of four ALU OP bits depending upon the state of the Status Flipflop. If status is not relevant to a particular instruction, then both sets of ALU OP bits are the same.

4. Arithmetic Processor Signals

Within the Arithmetic Logic Unit Processor the Data Path Control is through the instruction pipeline registers. The following Chip Signals are summarized in Table 7.

4.1 Data Path Control

The following are all inputs:
1. Instruction Code 5-0—these signals determine the instruction to be performed. Tables 3, 4, and 5 list the instructions.
2. Serial Input Select 1,0—these signals select one of four inputs to the LSS ALU Carry circuit in the arithmetic instructions. The inputs are:
   Carry right;
   Logic 0;
   Logic 1;
   Carry flipflop.

These signals also select one of four inputs to the shifter LSS or MSS in the Shift and Rotate Instructions. The inputs are:
   Logic 0;
   ALU Right or Left into the ALU path, or MQ Right or Left into the MQ path;
   Carry flipflop;
   ALU C Bus.
3. Read Address 5-0—these signals choose one of 64 inputs to the ALU "A" input as shown on Table 1.
4. Read/Write Address 5-0—these signals choose one of 64 inputs to the ALU "B" input as shown on Table 1. If a write is performed into the multiport RAM, these inputs also choose the location that is written into.
5. Input/Output Select 1,0—an input or output in the Arithmetic Processor is chosen from:
   Vertical Bus;
   Horizontal Bus;
   Down Path;
   Up Path.
6. Input/Output Functions 1,0—the operations of the bus, path, or associated RAM location as chosen by Input/Output Select is:
   Output enable (drive the selected bus or path from associated RAM location);
   Direct input (enable external bus or path to be used as ALU input);
   Load from external (load associated RAM location from selected external bus or path);
   Load from internal (load associated RAM location from ALU D Bus).

Selection of the Vertical Bus with the output enable function produces an output from the row selected by a true signal on its the Horizontal Bus. Selection of the Horizontal Bus with the output enable function produces an output from the column selected by a true signal on its Vertical Bus. Selection of the Up Path or Down Path enables the output regardless of the Input/Output Function.

4.2 Status Control

These inputs control loading of the multiport RAM, the status register, and the Sticky Overflow Flipflop. All operations are performed on a cell by cell basis. Storage loading depends upon: (1) ALUP Enable, (2) the Instruction, (3) Storage Enable, and (4) the ALUP Horizontal Masks. Note that the Zero Flipflop has multiple uses, and is also called the "Zero/Status Flipflop" and the "Status Flipflop".

1. Storage Enable 1,0—loading of the status flipflops, the sticky overflow flipflop, and the multiport RAM are allowed in the following combinations:
   Only the multiport RAM may be loaded;
   Only the Status register and the multiport RAM may be loaded;
   Only the Status register may be loaded;
   All may be loaded.
2. Status Dependent Enable 2,1,0—storage can be conditionally loaded only if the selected condition is satisfied:
   Horizontal Bus must be true;
   Carry Flipflop must be true;
   The Negative Flipflop must be true;
   The Zero/Status Flipflop must be true;
   Loading occurs;
   The Carry Flipflop must be false;
   The Negative Flipflop must be false;
   The Zero/Status Flipflop must be false.

4.3 Per Cell Signals

1. External Memory-input or tristate output. The pin is an output if Direction is true, otherwise it is an input.

4.4 Per Row Signals

Outputs are tristate unless noted.

2. ORed Bus Not—inverted two-state output. The signal is the logical NOR of (Data (N) AND Vertical Bus (N)) for all columns.

2. Horizontal Bus—input or output. The signal is the logical OR of (Horizontal Bus Flipflop (N) AND Vertical Bus (N)) for all columns. No more than one Vertical Bus line in an entire row of chips may be asserted at one time. The Bus is driven only if it is selected by Input/Output Select, the Input/Output function is output enable, and any Vertical Bus line in the chip is true. Data is provided by the Horizontal Bus Register.

3. ALU Left, ALU Right—input and output, or output and input, respectively. The signals are used for shifting operations.

4. MQ Left, MQ Right—input and output, or output and input, respectively. The signals are used for operations that simultaneously shift two words.

5. Carry Left, Carry Right—output and input, respectively. Data flows from right to left to propagate carry through the ALU.

6. Status Left, Status Right—input and output, or output and input, respectively. The signals are used for zero detection by the logic and some of the arithmetic instructions, and are used for special functions, double word shifts, and the Status Broadcast instructions.

7. Loop Left, Loop Right—input and output, or output and input, respectively. The signals are used in many operations to connect the most significant slice to the least significant slice.

4.5 Per Column Signals Summary

1. Vertical Bus—input or output. The Vertical Bus output is active if it is selected by Input/Output Select, the Input/Output Function is output enable, and the Horizontal Bus is asserted. Data is provided by the Vertical Bus Register.

2&3. Up, Down—may be input and output or output and input, as determined by the ALUP Vertical Mask 0 and 1, the Input/Output Select and the Input/Output Function. The source of data is chosen by ALUP Vertical Mask 2.

TABLE 1

| ADDRESS (hex) | MULTIPORT RAM MEMORY MAP R ADDR and R/W ADDR |
|---|---|
| 0-1F | USER GENERAL PURPOSE |
| 20 | MULTIPLIER/QUOTIENT (MQ) |
| 21 | MEMORY DATA REGISTER(2) |
| 22 | - UNUSED - |
| 23 | CARRY |
| 24 | NEGATIVE |
| 25 | ZERO/STATUS |
| 26 | OVERFLOW |
| 27 | STICKY OVERFLOW |
| 28 | HORIZ BUS DIRECT ACCESS/HORIZONTAL BUS REGISTER (3,4) |
| 29 | VERTICAL BUS DIRECT ACCESS/VERTICAL BUS REGISTER (3,5) |
| 2A | DOWN PATH DIRECT ACCESS/DOWN BUS REGISTER (3,5) |
| 2B | UP PATH DIRECT ACCESS/UP BUS REGISTER (3,5) |
| 2C | - UNUSED - |
| 2D | IMPEDANCE RESTORATION MASK |
| 2E | - UNUSED - |
| 2F | - UNUSED - |
| 30 | ALUP HORIZONTAL MASK 0 |
| 31 | ALUP HORIZONTAL MASK 1 |
| 32 | ALUP HORIZONTAL MASK 2 |
| 33 | - UNUSED - |
| 34 | ALUP VERTICAL MASK 0 |
| 35 | ALUP VERTICAL MASK 1 |
| 36 | ALUP VERTICAL MASK 2 |
| 37-3F | - UNUSED - |

NOTES:
1. BITS 20-21 AND 23-2B HAVE INPUTS IN ADDITION TO THE ALU D BUS.
2. FOR INPUT AND OUTPUT FROM/TO EXTERNAL MEMORY; MAY BE USED AS A GENERAL PURPOSE REGISTER.
3. CHOICE OF REGISTER OR DIRECT ACCESS IS MADE BY I/O FUNCTION.
4. THE REGISTER PROVIDES SOURCE OF OUTPUT TO BOTH HORIZONTAL BUS AND ORed BUS.
5. THE REGISTER PROVIDES SOURCE OF OUTPUT.

TABLE 2

ALUP VERTICAL MASK FUNCTIONS

| MASK | CELL INPUT(1) | CELL OUTPUT(1) | NOTES |
|---|---|---|---|
| 1 0 | | | |
| 0 0 | UP or DOWN pin | DOWN or UP pin | Fully Active (3) |
| 0 1 | logic 0 | DOWN or UP pin | Ignore input |
| 1 0 | UP or DOWN pin | DOWN or UP pin | Skip row (2) |
| 1 1 | UP or DOWN pin | DOWN or UP pin | Fully Active (3) |

FURTHER NOTES:
1. The Interrow Path, consisting of the UP and DOWN pins, is active only if the UP or DOWN bus is selected by I/O Select. If the I/O Select is UP, then data flows from an UP pin in one row to a DOWN pin in the next row, and the source of data may be the UP Register. If the I/O Select is DOWN, then data flows from a DOWN pin to an UP pin, and the source of data may be the DOWN Register.
2. UP pin receives DOWN pin signal (UP driver is enabled), or DOWN pin receives UP pin signal (DOWN driver is enabled).
3. Selection of the source to output is made by the Vertical Mask 2: 0 - UP or DOWN flipflop, 1 - ALU D Bus.

TABLE 3

LOGIC INSTRUCTIONS

| MNEMONIC | ALU D BUS FUNCTION |
|---|---|
| ONE | ONE |
| A_XOR_B | A XOR B |
| ZERO | ZERO |
| A_AND_B | A AND B |
| A_OR_B | A OR B |
| A_XNOR_B | A XNOR B |
| A_NOR_B | A NOR B |
| A_NAND_B | A NAND B |

NOTE:
1. ALU CARRY OUT = 0 FOR THE LOGIC INSTRUCTIONS.

TABLE 4

FIXED POINT ARITHMETIC INSTRUCTIONS

| MNEMONIC | FUNCTION |
|---|---|
| SIMPLE GROUP | |
| B_MINUS_A | B MINUS A MINUS 1 PLUS CIN |
| A_PLUS_CIN | A PLUS CIN |
| A_PLUS_B | A PLUS B PLUS CIN |
| B_PLUS_CIN | B PLUS CIN |
| A_MINUS_B | A MINUS B MINUS 1 PLUS CIN |
| A_MINUS_1 | A MINUS 1 PLUS CIN |
| NOT_A_PLUS_CIN | A PLUS CIN |
| SPECIAL GROUP | |

TABLE 4-continued

| FIXED POINT ARITHMETIC INSTRUCTIONS | |
|---|---|
| MNEMONIC | FUNCTION |
| MF | MULTIPLY FIRST |
| MI | MULTIPLY INTERMEDIATE |
| ML | MULTIPLY LAST |
| DF | DIVIDE FIRST |
| DI | DIVIDE INTERMEDIATE |
| DL | DIVIDE LAST |

TABLE 5

| SHIFT AND STATUS INSTRUCTIONS | |
|---|---|
| MNEMONIC | FUNCTION |
| ALSL | ARITHMATIC AND LOGICAL SHIFT LEFT(1) |
| ALSR | ARITHMATIC AND LOGICAL SHIFT RIGHT(2) |
| RL | ROTATE LEFT |
| RR | ROTATE RIGHT |
| DALSL | DOUBLE ARITHMATIC AND LOGICAL SHIFT LEFT |
| DALSR | DOUBLE ARITHMATIC AND LOGICAL SHIFT RIGHT |
| DRL | DOUBLE ROTATE LEFT |
| DRR | DOUBLE ROTATE RIGHT |
| PL | PARITY LEFT |
| LOR | LOGICAL OR RIGHT |
| PSWAP | PARALLEL SWAP |
| SSWAP | SERIAL SWAP |
| SBL | STATUS BROADCAST LEFT |
| SBR | STATUS BROADCAST RIGHT |
| QSL | QUADRUPLE SHIFT LEFT |
| QSR | QUADRUPLE SHIFT RIGHT |

NOTE:
1. LEFT: DATA FLOWS FROM LSS TOWARD MSS, LSS COLUMN < MSS COLUMN
2. RIGHT: DATA FLOWS FROM MSS TOWARD LSS

TABLE 6

| CONFIGURATION INSTRUCTIONS | |
|---|---|
| MNEMONIC | FUNCTION |
| CONFIGURE | LOAD MULTIPORT RAM INDEPENDENT OF ALUP HORIZONTAL MASKS |

TABLE 7

| CHIP SIGNALS | |
|---|---|
| 1. COMMON CONTROL | |
|   1. GND, VCC, VDD | 3 |
|   2. ALUP Clock | 1 |
|   3. ALUP Enable | 1 |
| | 5 |
| 2. MEMORY DATA REGISTER CONTROL | |
|   1. Direction | 1 |
|   2. Strobe | 1 |
| | 2 |
| 3. ARITHMETIC PROCESSOR | |
|   A. DATA PATH CONTROL | |
|     1. Instruction Code 0-5 | 6 |
|     2. Serial Input Select 0,1 | 2 |
|     3. Read Address 0-5 | 6 |
|     4. Read/Write Address 0-5 | 6 |
|     5. Input/Output Select 0,1 | 2 |
|     6. Input/Output Function 0,1 | 2 |
| | 24 |
|   B. STATUS CONTROL | |
|     1. Storage Enable 0,1 | 2 |
|     2. Status Storage Enable 0,1,2 | 3 |
| | 5 |
| C. PER CELL | |
| Note: For row M, M=0 to R-1, and column N, N=0 to C-1: | |
|   1. External Memory M, N | 1 |
| D. PER ROW | |
| Note: For row M, M=0 to R-1: | |
|   1. Not ORed Bus M | 1 |
|   2. Horizontal Bus M | 1 |
|   3. ALU Left M, ALU Right M | 2 |
|   4. MQ Left M, MQ Right M | 2 |
|   5. Carry Left M, Carry Right | 2 |
|   6. Status Left M, Status Right M | 2 |
|   7. Loop Left M, Loop Right M | 2 |
| | 12 |
| E. PER COLUMN | |
| Note: For column N, N=0 to C-1: | |
|   1. Vertical Bus N | 1 |
|   2. Up N, Down N | 2 |
| | 3 |

SUMMARY:
PINS = COMMON + PER CELL *(ROWS * COLUMNS) + PER ROW *(ROWS) + PER COLUMN *(COLUMNS)
= 36 + (R* C) + (12*R) + (3* C)
VARIOUS CASES:

| R | C | COMMON | CELLS | TOTAL |
|---|---|---|---|---|
| 1 | 16 | 36 | 76 | 112 |
| 2 | 16 | 36 | 104 | 140 |

I claim:

1. In an associative processor array including M rows and N columns of identical processing cells whereby said M and N are positive integers, with each cell connected horizontally to its left and right to a neighboring cell and connected vertically to its up and down to a neighboring cell, with a vertical bus connecting all cells in a column and a horizontal bus connecting all cells in a row; each cell including a memory for storing control and data information, with the output of said memory coupled to an arithmetic logic unit (ALU) and with the output of said ALU coupled to register means within each cell, with said cells as forming said array for performing arithmetic operations on words each consisting of a plurality of bits and each including word a given number of slices to enable an arithmetic function to be implemented by each cell, the improvement therewith of apparatus for providing data paths between cells in a given row in said array, comprising:

a first path coupled to each of said cells in said given row and operative to move a first bit from left to right or from right to left in said row with said path coupled to each of said memory in said cells, a second path coupled to each of said ALU's in said cells in said given row and operative to propagate an arithmetic carry from said ALU of any of said cells unidirectionally to another cell in said row, a third path coupled to each of said cells in said row and operative to move a second bit from one cell to the next in a given selected direction as from right to left or from left to right, and means within each cell and responsive to said second bit to store said bit in said cell, a fourth path coupled to each of said cells in said row and operative to move a third bit from said ALU output of each cell from one cell to the next with said means within each cell responsive to said third bit for storing said bit in any of said cells, a fifth path coupled to each of said cells in said row and operative to move a fourth bit from one cell to the next in said row from left to right or from right to left, and storage register means within each cell for storing said fourth bit in each storage register means in said cell to enable said cell to operate with a given slice of said word to perform said arithmetic function according to said bits as stored within said cell.

2. The associative processor array according to claim 1, wherein said first path is designated as the ALU path.

3. The associative processor array according to claim 1, wherein said second path is designated as the Carry path.

4. The associative processor array according to claim 1, wherein said third path is designated as the MQ path (Multiplier/quotient).

5. The associative processor array according to claim 1, wherein said fourth path is designated as the Loop path for providing end-to-end coupling in double word operations.

6. The associative processor according to claim 1, wherein said fifth path is designated as the Status path.

7. The associative processor according to claim 1, wherein said means within each cell is a flip-flop having an output coupled to said third bus and an input coupled to said fourth bus.

8. The associative processor according to claim 1, wherein said storage register means is a status register for receiving and storing said fourth bit for each of said cells used in a word.

9. The associative processor according to claim 1, wherein said given number of slices includes a least significant slice, a most significant slice and an intermediate significant slice.

10. The associative array according to claim 1, wherein said first, third, fourth and fifth paths are coupled to transversal multiplexers coupled to each cell in said given row and operative to selectively multiplex data on said paths.

11. The associative array according to claim 1, wherein said memory is a multiport RAM having two outputs A and B, with one output (A) connected to a first input of said ALU and a second output (B) connected to a second input of said ALU.

12. The associative array according to claim 1, wherein said paths as coupled to the left-most cell in the top row are connected to respective right path inputs of the right-most cell in the bottom row.

13. The associative array according to claim 10, wherein each of said multiplexer include means for bypassing said data paths from any selected ones of said cells in said given row.

14. The associative processor according to claim 1, wherein said first, second, third, fourth, and fifth paths are coupled to each cell so that the right side of one cell is coupled via said paths to the left side of a right neighboring cell with the left side of said cell coupled to the right side of a left neighboring cell and so on.

15. The associative processor according to claim 14, wherein the last cell on the right of a row is coupled to the first cell on the left of said row via said paths.

16. The associative processor according to claim 14, wherein the last cell on the right of a row is connected to the first cell on the left of an adjacent row via said paths.

* * * * *

UNITED STATES PATENT AND TRADEMARK OFFICE
CERTIFICATE OF CORRECTION

PATENT NO. : 4,580,215
DATED : April 1, 1986
INVENTOR(S) : Steven G. Morton

It is certified that error appears in the above-identified patent and that said Letters Patent is hereby corrected as shown below:

At column 20, line 41 delete "including word" and insert --word including--.

[SEAL]

Signed and Sealed this

Twenty-ninth Day of July 1986

Attest:

Attesting Officer

DONALD J. QUIGG

Commissioner of Patents and Trademarks